(12) United States Patent
Nanjo

(10) Patent No.: US 7,646,418 B2
(45) Date of Patent: Jan. 12, 2010

(54) IMAGE CAPTURE APPARATUS AND ZOOM LENS

(75) Inventor: Yusuke Nanjo, Kanagawa (JP)

(73) Assignee: Sony Corporation, Tokyo (JP)

( * ) Notice: Subject to any disclaimer, the term of this patent is extended or adjusted under 35 U.S.C. 154(b) by 604 days.

(21) Appl. No.: 11/598,581

(22) Filed: Nov. 14, 2006

(65) Prior Publication Data

US 2007/0126911 A1 Jun. 7, 2007

(30) Foreign Application Priority Data

Nov. 16, 2005 (JP) ............................ P2005-331333

(51) Int. Cl.
*H04N 5/225* (2006.01)

(52) U.S. Cl. .................................................... 348/335

(58) Field of Classification Search ................ 348/335; 359/687, 642, 676, 758
See application file for complete search history.

(56) References Cited

U.S. PATENT DOCUMENTS

| | | | | |
|---|---|---|---|---|
| 4,114,171 | A * | 9/1978 | Altman | 396/351 |
| 5,448,400 | A | 9/1995 | Kikuchi et al. | |
| 6,327,100 | B1 * | 12/2001 | Yamanashi | 359/689 |
| 6,850,279 | B1 * | 2/2005 | Scherling | 348/335 |
| 7,170,558 | B2 * | 1/2007 | Yokota et al. | 348/337 |
| 7,170,690 | B2 * | 1/2007 | Ophey | 359/676 |
| 7,253,834 | B2 * | 8/2007 | Mihara et al. | 348/208.11 |
| 7,382,546 | B2 * | 6/2008 | Konno | 359/678 |
| 2004/0109076 | A1 | 6/2004 | Yokota et al. | |

FOREIGN PATENT DOCUMENTS

| | | |
|---|---|---|
| EP | 1 494 054 A1 | 1/2005 |
| GB | 2 327 508 A | 1/1999 |
| JP | 11-271867 | 10/1999 |
| JP | 2004-170707 | 6/2004 |
| JP | 2004-193848 | 7/2004 |
| JP | 2004-354869 | 12/2004 |
| WO | WO 2005/073774 A1 | 8/2005 |

OTHER PUBLICATIONS

European Search Report; Application No./Patent No. 06124255.8-1234; dated Mar. 19, 2007.

* cited by examiner

*Primary Examiner*—James M Hannett
(74) *Attorney, Agent, or Firm*—Rader, Fishman & Grauer PLLC

(57) ABSTRACT

An image capture apparatus includes: a zoom lens arranged in a housing and which includes fixed lens groups, movable lens groups and at least three prisms; and an imager device arranged in the housing. The zoom lens includes: a fixed first lens group including a negative lens group having a first optical axis, a first prism approximately perpendicularly folding an optical axis, and a positive lens group having a second optical axis folded by the first prism; movable lens groups and at least one fixed lens group arranged along the second optical axis to perform a zooming action, an image plane position correcting action and a focusing action; and a second prism arranged on an image side relative to a movable lens group that is a closest to the image side among the plurality of movable lens groups for approximately perpendicularly folding the optical axis.

14 Claims, 11 Drawing Sheets

IMAGE CAPTURE APPARATUS AND ZOOM LENS

BACKGROUND OF THE INVENTION

1. Field of the Invention

The present invention relates to an image capture apparatus and zoom lens, and more particularly o a zoom lens having an optical-axis folding means and an image capture apparatus using such a zoom lens, and to techniques capable of compatibly realizing an increase in the size of an imager device of a digital camera and a reduction in the thickness of the digital camera.

2. Description of Related Art

In recent years, digital cameras have exceeded film cameras in annual sales and have spread at a remarkable pace. Commercially popular types of digital cameras, particularly so-called digital compact cameras, are small-sized, lightweight, and low in running cost compared to compact film cameras and allow users to confirm captured results on their liquid crystal display screens immediately after each image capture. This is considered to be the reason why digital compact cameras have spread.

A critical issue to the miniaturization of a compact digital camera particularly resides in the thickness of the lens used, and a large number of digital cameras adopt a telescopic lens barrel, called a retractable lens, which when not used can be accommodated in a camera in a compact, collapsed state. However, such a retractable lens has the large disadvantage of being easily damaged by the shock of an external force.

As opposed to the retractable lens, there is a thin-type compact digital camera whose thinness is realized by providing an optical-axis folding member in the lens system as shock-resistant means which enables a reduction in the thickness of the camera, as disclosed in Japanese Patent Application Publication Number 2004-354869 (Patent Literature 1), Japanese Patent Application Publication Number 2004-193848 (Patent Literature 2) and Japanese Patent Application Publication Number 2004-170707 (Patent Literature 3). Such a so-called folding optical system can achieve a reduction in the thickness of the camera, but it needs a space in which to arrange reflection members such as a prism and a mirror. In addition, the reflection members do not contribute to a zooming function or an image forming function in the zoom lens, and they occupy an originally unnecessary space in the zoom lens. As a result, the reflection members invite an increase in the volume of the lens and hinder the miniaturization of the camera. For this reason, in the field of compact digital cameras which adopts folding optical systems; the miniaturization of cameras has been achieved by adopting imager devices of a small screen size.

However, if the screen size of an imager device is made small with the number of effective pixels capable of ensuring high resolution maintained, the pixel pitch becomes fine and the area of one pixel of a sensor for photoelectric conversion becomes so small as to invite a decrease in sensitivity and an increase in noise. As a result, this construction tends to easily cause noticeable losses of highlight details in bright subjects and noticeable losses of shadow details in dark subjects, and it is unfavorable to the retractable lens in terms of image quality.

In addition, even if the miniaturization of a lens is achieved by adopting a small-sized imager device, the outside dimension of the package of the imager device is considerably large compared to its effective screen size, so that the thickness of a camera is restricted by the package size and the extent of reduction of the thickness is limited.

Although the compact digital cameras pursue miniaturization by combining small-sized imager devices with retractable lenses or folding lenses, digital cameras of high image quality are designed to meet demands for higher image quality. The digital cameras of high image quality can suppress the occurrence of noise even in the case of a high sensitivity setting and can readily avoid losses of highlight details and shadow details owing to their wide range of grayscale representation and can attain high resolution, by adopting large-sized imager devices, such as 35 mm full size devices or so-called APS-C size devices. Such a digital camera is marketed as a single-lens reflex or range finder type of camera which uses interchangeable lenses, and it is incomparably larger in volume and weight than compact digital cameras are. The depthwise dimension of the digital camera in particular becomes so large as to remarkably impair portability, even when a zoom lens having a zoom ratio of the order of 3 and approximately equal to the average zoom ratio of compact digital cameras is attached.

SUMMARY OF THE INVENTION

As mentioned previously, if a compact digital camera with a zoom lens is miniaturized by the adoption of a small-sized imager device, high quality images cannot be obtained in terms of noise, grayscale representation or the like, but if high image quality is pursued, an interchangeable lens type camera is needed which becomes large-sized and heavyweight when a zoom lens is attached thereto. In the market, there is still a strong demand for a compact digital camera with a zoom lens which is a cross between a compact digital camera and a single-lens reflex camera, thereby maintaining high image quality by adopting an imager device having a sufficient size to obtain the high image quality.

As mentioned previously, a reduction in thickness is particularly important to miniaturization, and if the above-cited Patent Literature 1 is applied, the depth of a zoom lens can be made thin. However, the folding optical system is essentially a technique which increases the volume of a lens itself, and if a lens system is proportionately enlarged in accordance with a large screen size in a compact camera which is to be realized in combination with an imager device of small screen size, the folded length of a lens barrel unpreferably becomes so long as to hinder the use of the camera. The means disclosed in Patent Literatures 2 and 3 are useful as means for reducing the folded length of a lens barrel, but since two movable lens groups are not present on one optical axis (which is not folded halfway), an eccentric error easily occurs between the two movable lens groups and measurement and adjustment of the eccentric error is extremely difficult, so that it is difficult to carry but mass-production while maintaining stable performance.

In addition, if the folded length of the lens barrel is reduced by the means disclosed in Patent Literatures 2 and 3, there may be an issue that the dimension of a package containing an imager device of large screen size hinders a reduction in the thickness of the camera.

Accordingly, it is desirable to provide an image capture apparatus in which an imager device of large effective screen size can be adopted to realize high image quality and which has a thin body of good portability with a lens designed to project by a small amount from the front end of a lens barrel. The present invention is made in view of the above.

According to a first aspect of the present invention, there is provided an image capture apparatus which includes a zoom lens arranged in a housing and which includes a plurality of fixed lens groups, a plurality of movable lens groups and at least three optical-axis folding means, and an imager device arranged in the housing, for converting an image formed by the zoom lens into an electrical signal. The zoom lens includes, in the following order from an object side, a fixed first lens group including a negative lens group having a first optical axis, first optical-axis folding means for approximately perpendicularly folding an optical axis, and a positive lens group having a second optical axis folded by the first optical-axis folding means, the fixed first lens group having positive refractive power as a whole, a plurality of movable lens groups and at least one fixed lens group arranged along the second optical axis to perform a zooming action, an image plane position correcting action and a focusing action, and second optical-axis folding means arranged on an image side relative to a movable lens group closest to the image side among the plurality of movable lens groups, for approximately perpendicularly folding the optical axis. The optical axis is folded by optical-axis folding means positioned at a location closest to the image side among the at least three optical-axis folding means including the first and second optical-axis folding means such that the imager device is arranged approximately in parallel with an inside wall surface of the housing.

Accordingly, in the above-mentioned image capture apparatus, the imager device is arranged approximately in parallel with the inside wall surface of the housing, and any of the plurality of movable lens groups is arranged on the second optical axis.

According to a second aspect of the present invention, there is provided a zoom lens which includes, in the following order from an object side, a first lens group including a negative lens group having a first optical axis, first reflection means for approximately perpendicularly folding an optical axis, and a positive lens group having a second optical axis folded by the first reflection means, the first lens group having positive refractive power as a whole, a second lens group having negative refractive power and moving along the second optical axis to mainly perform a power variation, a third lens group fixed on the second optical axis and having positive refractive power, a fourth lens group having positive refractive power and moving along the second optical axis to perform focusing as well as correction of a variation of an image forming position due to the power variation, a fifth lens group having negative refractive power and acting to extend a composite focus length and a back focus formed by the first to fourth lens groups, and a plurality of reflection means.

Accordingly, in the above-mentioned zoom lens, the plurality of reflection means excluding the first reflection means are arranged along a long back focus.

In the above-mentioned image capture apparatus, since the imager device is arranged in a face-to-face relationship with the inside wall surface of the housing, the width of a package of the imager device does not limit the thickness of the image capture apparatus, i.e., the size thereof in the direction of the optical axis incident on the first lens group, and does not hinder a reduction in the thickness of the image capture apparatus. In addition, since main lens groups, particularly the plurality of movable lens groups, are arranged along the second optical axis, the occurrence of eccentric errors is suppressed, and even if an eccentric error occurs, the eccentric error can be readily measured and adjusted.

Furthermore, in the above-mentioned zoom lens, a long back focus can be ensured, and the plurality of reflection means excluding the first reflection means can be arranged along the long back focus.

According to another aspect of the present invention, there is provided an image capture apparatus which includes a zoom lens arranged in a housing and which includes a plurality of fixed lens groups, a plurality of movable lens groups and at least three optical-axis folding means, and an imager device arranged in the housing, for converting an image formed by the zoom lens into an electrical signal. The zoom lens includes, in the following order from an object side, a fixed first lens group including a negative lens group having a first optical axis, first optical-axis folding means for approximately perpendicularly folding an optical axis, and a positive lens group having a second optical axis folded by the first optical-axis folding means, the fixed first lens group having positive refractive power as a whole, a plurality of movable lens groups and at least one fixed lens group arranged along the second optical axis to perform a zooming action, an image plane position correcting action and a focusing action, second optical-axis folding means arranged on an image side relative to a movable lens group closest to the image side among the plurality of movable lens groups, for approximately perpendicularly folding the optical axis, and third optical-axis folding means arranged on the image side relative to the second optical-axis folding means. The second optical axis is folded into a third optical axis approximately parallel to a plane containing the first optical axis and the second optical axis by the second optical-axis folding means, and the third optical axis is folded by the third optical-axis folding means such that the imager device is arranged approximately in parallel with an inside wall surface of the housing. According to this image capture apparatus, the number of optical-axis folding means is limited to three and the folding directions thereof are restricted, such that it is possible to realize an image capture apparatus having the advantage of the above-mentioned first aspect apparatus and provide a construction suitable for cameras of simple design.

According to another aspect of the present invention, there is provided an image capture apparatus which includes a zoom lens arranged in a housing and which includes a plurality of fixed lens groups, a plurality of movable lens groups and at least four optical-axis folding means, and an imager device arranged in the housing, for converting an image formed by the zoom lens into an electrical signal. The zoom lens includes, in the following order from an object side, a fixed first lens group including a negative lens group having a first optical axis, first optical-axis folding means for approximately perpendicularly folding an optical axis, and a positive lens group having a second optical axis folded by the first optical-axis folding means, the fixed first lens group having positive refractive power as a whole, a plurality of movable lens groups and at least one fixed lens group arranged along the second optical axis to perform a zooming action, an image plane position correcting action and a focusing action, second optical-axis folding means arranged on an image side relative to a movable lens group closest to the image side among the plurality of movable lens groups, third optical-axis folding means arranged on the image side relative to the second optical-axis folding means, and fourth optical-axis folding means arranged on the image side relative to the third optical-axis folding means. The second optical axis is folded into a third optical axis approximately parallel to a plane containing the first optical axis and the second optical axis, by the second optical-axis folding means, the third optical axis is folded into a fourth optical axis approximately parallel to the second optical axis by the third optical-axis folding means, and the fourth optical axis is folded by the fourth optical-axis folding means such that the imager device is arranged approximately in parallel with an inside wall surface of the housing. Accordingly, since four optical-axis folding means are provided, the long back focus can be folded into a noticeable state to reduce the thickness of the housing and minimize the vertical and horizontal dimensions thereof.

According to another aspect of the present invention, in the image capture apparatus, the second optical-axis folding means and the third optical-axis folding means are respectively constructed as different reflection surfaces of the same prism, and an entrance surface and an exit surface of the prism are positioned in the same plane. Accordingly, although four optical-axis folding means are provided, all the optical-axis folding means can be formed of three prisms, so that it is possible to realize reductions in the cost and size of the image capture apparatus.

According to another aspect of the present invention, there is provided an image capture apparatus which includes a zoom lens arranged in a housing and which includes a plurality of fixed lens groups, a plurality of movable lens groups and at least four optical-axis folding means, and an imager device arranged in the housing, for converting an image formed by the zoom lens into an electrical signal. The zoom lens includes, in the following order from an object side, a fixed first lens group including a negative lens group having a first optical axis, first optical-axis folding means for approximately perpendicularly folding an optical axis, and a positive lens group having a second optical axis folded by the first optical-axis folding means, the fixed first lens group having positive refractive power as a whole, a plurality of movable lens groups and at least one fixed lens group arranged along the second optical axis to perform a zooming action, an image plane position correcting action and a focusing action, second optical-axis folding means arranged on an image side relative to a movable lens group closest to the image side among the plurality of movable lens groups, third optical-axis folding means arranged on the image side relative to the second optical-axis folding means, and fourth optical-axis folding means arranged on the image side relative to the third optical-axis folding means. The second optical axis is folded into a third optical axis approximately parallel to the first optical axis by the second optical-axis folding means, the third optical axis is folded into a fourth optical axis approximately perpendicular to a plane containing the second optical axis and the third optical axis by the third optical-axis folding means, and the fourth optical axis is folded by the fourth optical-axis folding means such that the imager device is arranged approximately in parallel with an inside wall surface of the housing. Accordingly, it is possible to increase the degree of freedom of design of the image capture apparatus.

According to another aspect of the present invention, in the image capture apparatus, each of the optical-axis folding means following the first optical-axis folding means is constructed as a reflection surface of a prism having a refractive index and angle settings to ensure total reflection for all effective rays across the entire zoom range. Accordingly, since each of the optical-axis folding means excluding the first optical-axis folding means is constructed by using the total reflection of a prism, it is possible to minimize the loss of the amount of transmitted light.

According to another aspect of the present invention, in the image capture apparatus, a package which houses the imager device has an outside dimension of at least 20 mm long on its screen's shorter side. Accordingly, the maintenance of high image quality and the miniaturization of the camera can be compatibly realized at high levels.

According to another aspect of the present invention, in the zoom lens, if the first reflection means is a reflection surface of a right-angled prism and the right-angled prism has a refractive index nf, and if the plurality of reflection means arranged on an image side relative to the fifth lens group includes reflection surfaces of a plurality of prisms containing total reflection surfaces and the prisms have a refractive index nr, the conditional formulae (1) $1.8 < nf$ and (2) $1.62 < nr$ are satisfied. Accordingly, it is possible to realize the miniaturization of the optical-axis folding means and reduce the loss of the amount of transmitted light.

According to another aspect of the present invention, in the zoom lens, the negative lens group of the first lens group having the first optical axis is made of one concave meniscus lens having a convex surface facing the object side. Accordingly, it is possible to minimize the depthwise length, i.e., the thickness, of the zoom lens.

According to another aspect of the present invention, in the zoom lens, the negative lens group of the first lens group having the first optical axis is made of one convex lens and two concave meniscus lenses each having a convex surface facing the object side, the one convex lens and the two concave meniscus lenses being arranged in order of mention from the object side. Accordingly, the two concave lenses can share negative refractive power to reduce a distortion occurring from the negative lenses, an over-curvature of field and a chromatic difference of magnification, and the convex lens is arranged at a location closest to the object side, thereby canceling and correcting these aberrations.

According to another aspect of the present invention, in the zoom lens, the positive lens group having the second optical axis, which is included in the first lens group, is made of a cemented lens which includes a convex lens, a concave lens and a convex lens arranged in order of mention from the object side, the second lens group is made of two concave lenses and one convex lens arranged in order of mention from the object side, the third lens group is made of one convex lens, the fourth lens group is made of a cemented lens which includes a convex lens and a concave lens, and the fifth lens group is made of a cemented lens which includes a concave lens and a convex lens, and the conditional formulae (3) $v113a < 30$ and (4) $v113c < 55$ are satisfied, where $v113a$ represents an Abbe number of the convex lens that is positioned at a location closest to the object side and constitutes part of the positive lens group of the first lens group, and $v113c$ represents an Abbe number of the convex lens of the cemented lens that constitutes part of the positive lens group of the first lens group. Accordingly, it is possible to ensure a long back focus while compatibly realizing miniaturization and cost reduction.

According to another aspect of the present invention, in the zoom lens, the conditional formulae (5) $0.65 < |\beta 2T| < 1.1$, (6) $\beta 5 < 1.2$, and (7) $|f5/f3| < 2.2$ are satisfied, where $\beta 2T$ represents the transverse magnification of the second lens group at the telephoto end thereof, $\beta 5$ represents the transverse magnification of the fifth lens group, f3 represents the focal length of the third lens group, and f5 represents the focal length of the fifth lens group. Accordingly, the positive lens group of the first lens group and the following lens groups can be elongated to achieve a reduction in the thickness of the image capture apparatus.

BRIEF DESCRIPTION OF THE DRAWINGS

The invention will become more readily appreciated and understood from the following detailed description of embodiments and numerical embodiments of the invention when taken in conjunction with the accompanying drawings, in which.

DETAILED DESCRIPTION OF EMBODIMENTS

Embodiments of an image capture apparatus and a zoom lens according to the present invention will be described below with reference to the accompanying drawings.

Figure 1:
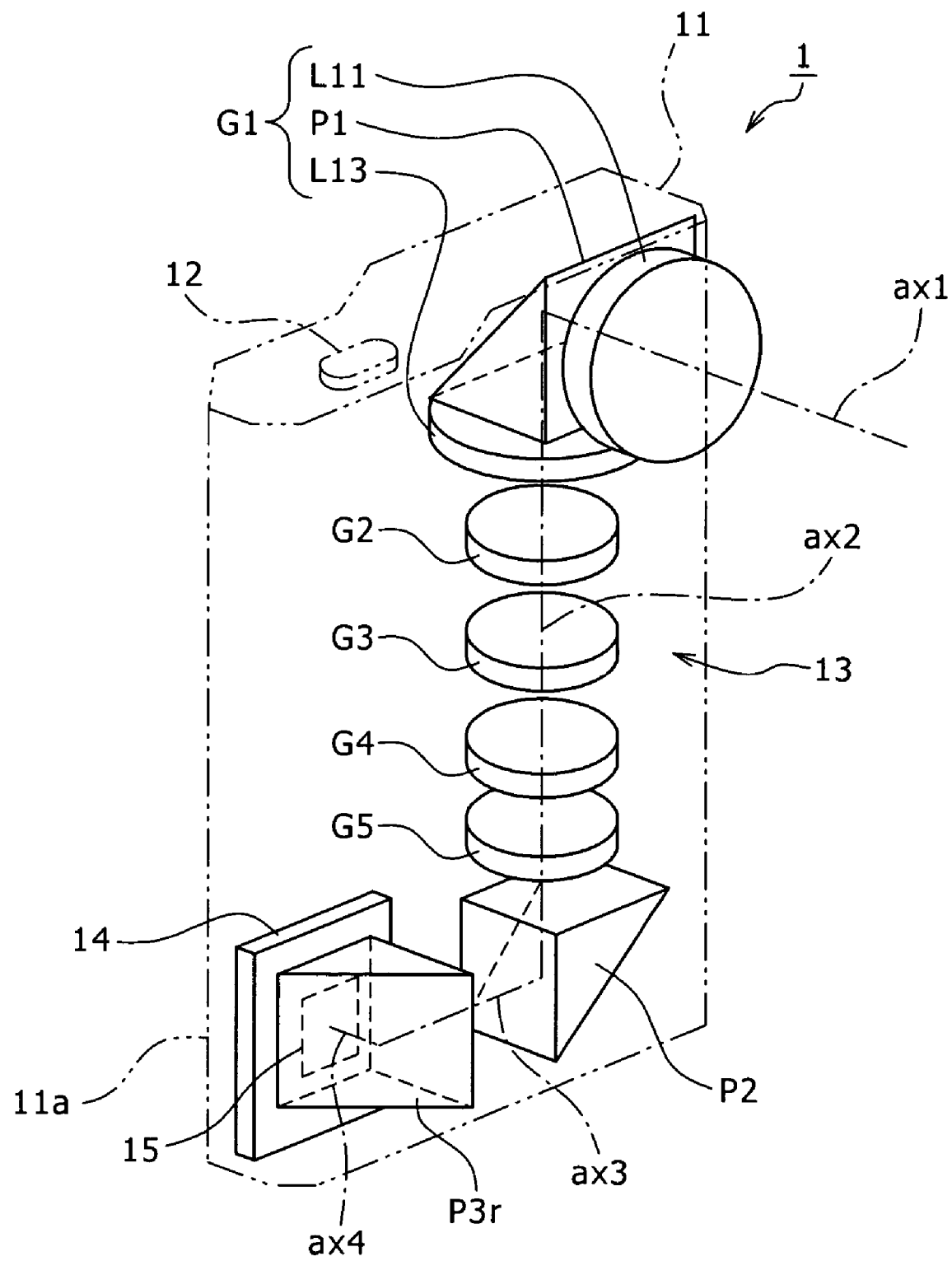
FIG. 1 is a schematic perspective view showing an image capture apparatus according to a first embodiment of the present invention.
Figure 2:
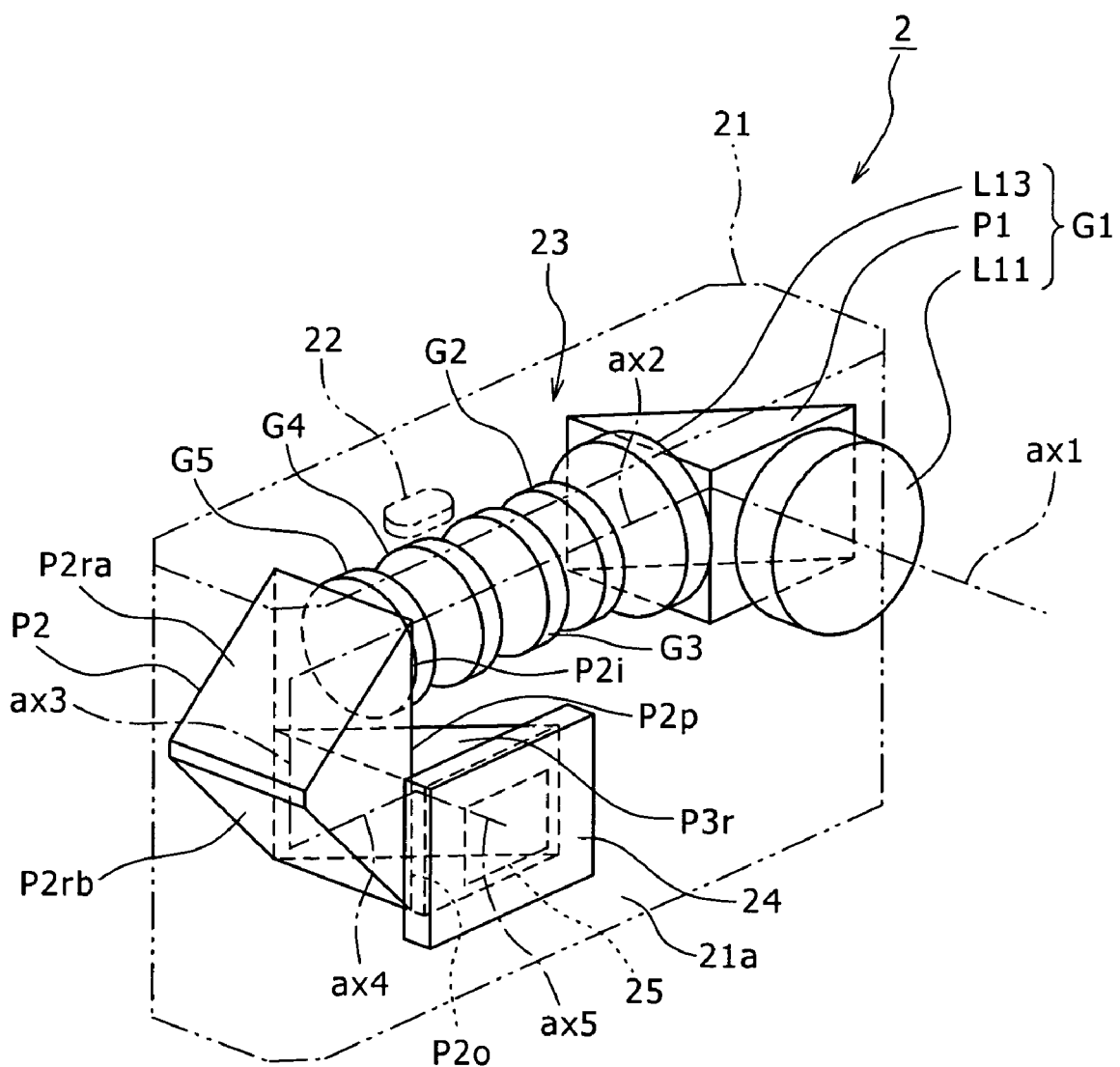
FIG. 2 is a schematic perspective view showing an image capture apparatus according to a second embodiment of the present invention.
Figure 3:
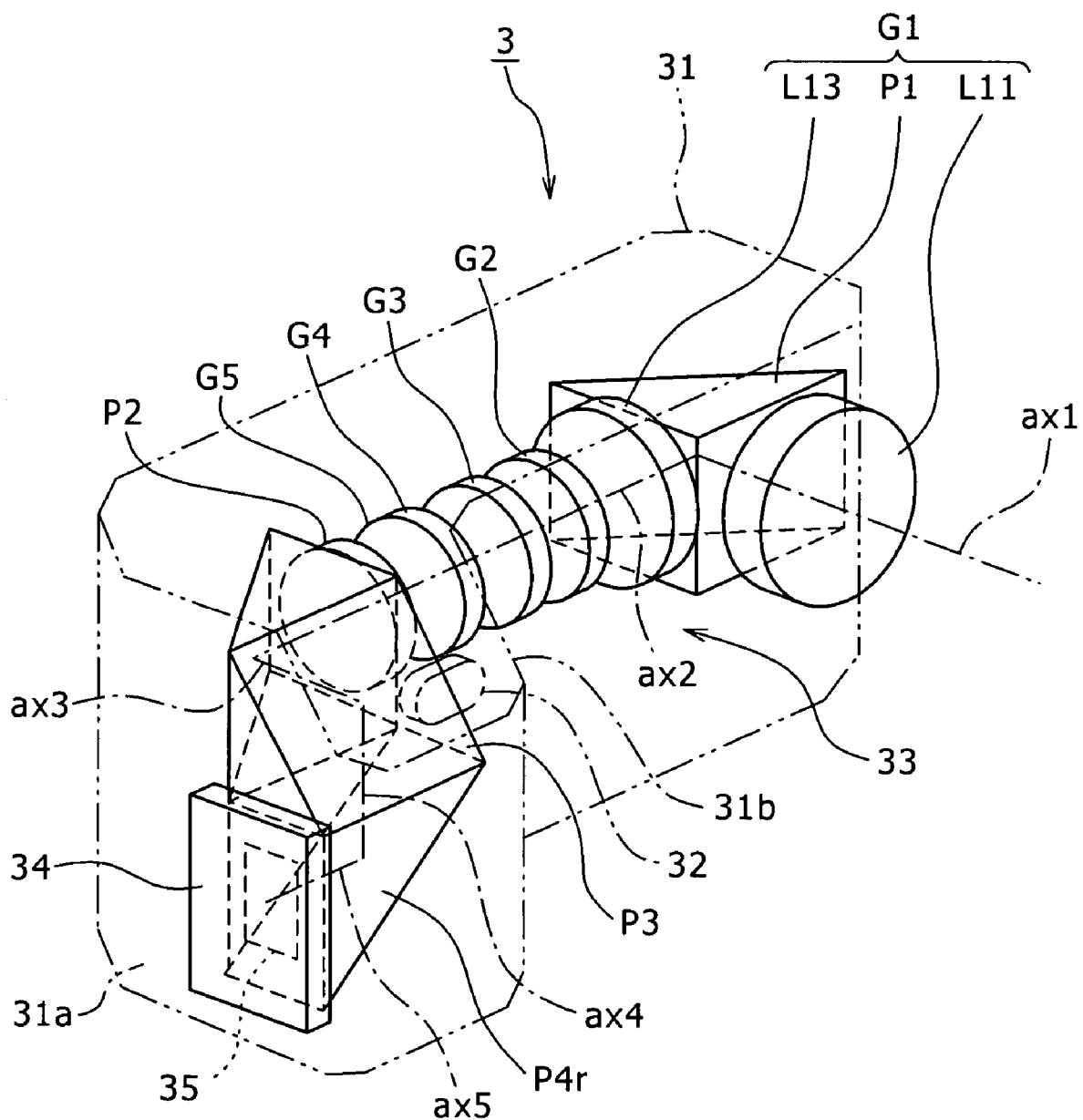
FIG. 3 is a schematic perspective view showing an image capture apparatus according to a second embodiment of the present invention.

FIGS. 1 to 3 diagrammatically show the first to third embodiments of an image capture apparatus according to the present invention, respectively. First of all, matter which is common to all three of the first, second and third embodiments will be described below.

A zoom lens, an imager device and the like, all of which will be described later, are arranged in a housing 11, 21 or 31 represented by dot-dot-dashed lines. A user can take an image by depressing a release button 12, 22 or 32 arranged on the top surface of the housing 11, 21 or 31. A zoom lens 13, 23 or 33 is arranged in the housing 11, 21 or 31 along with a lens barrel, an aperture stop device, a lens driving device and the like, none of which is shown, so that an image is formed on the light-receiving surface of an imager device 15, 25 or 35 which is accommodated in a package 14, 24 or 34.

One of the most critical features of an image capture apparatus 1, 2 or 3 and the zoom lens 13, 23 or 33 is that their sizes, i.e., thicknesses, in the direction of an entrance optical axis ax1 (corresponds to the first optical axis) are made thin by folding the entrance optical axis ax1 by means of a prism P1 (corresponds to the first optical axis holding means) within a first lens group G1 (corresponds to the fixed lens group), and that a wide surface of a package 14, 24 or 34 of the imager device 15, 25 or 35 is arranged to be forced against the inside of a comparatively wide surface 11a, 21a or 31a (corresponds to the inside wall surface) of the housing 11, 21 or 31 by folding the optical axis by means of the last prism Pir (i=3, 4, . . . ) arranged in front of the imager device 15, 25 or 35, in order to prevent the package 14, 24 or 34 of the imager device 15, 25 or 35 from hindering a reduction in thickness of the housing 11, 21 or 31.

The construction of the optical system 13 in the image capture apparatus 1 according to the first embodiment will be described below with reference to FIG. 1. The zoom lens 13 includes, in the following order from an object side, the first lens group G1 which is made of a negative lens group L11 having the first optical axis (the entrance optical axis) ax1, the first prism P1, and a positive lens group L13 having a second optical axis ax2 folded downwardly approximately 90 degrees by the prism P1, a second lens group G2 (corresponds to the movable lens group) which has negative refractive power and moves along the optical axis to mainly perform a zooming action, a third lens group G3 (corresponds to the fixed lens group) which is fixed on the optical axis and has positive refractive power, a fourth lens group G4 (corresponds to the fixed lens group) which has positive refractive power and performs focusing as well as correction of variations of an image forming position due to power variations, and a fifth lens group G5 (corresponds to the fixed lens, group) which is fixed on the optical axis and has negative refractive power, the second lens group G2, the third lens group G3, the fourth lens group G4, and the fifth lens group G5 being arranged along a common (second) optical axis ax2. The second optical axis ax2 is folded laterally approximately 90 degrees by a second prism P2 (corresponds to the second optical axis holding means) into a third optical axis ax3 to prevent an increase in the height dimension of the housing 11. The optical axis is further folded approximately 90 degrees into a fourth optical axis ax4 approximately parallel to the first optical axis ax1, by a third prism P3r (corresponds to the third optical axis holding means) arranged at the last position, such that the wide surface of the package 14 of the imager device 15 with shorter sides at least 20 mm long is arranged in a face-to-face relationship with a wide inside wall of the housing 11, i.e., the inside surface of the back wall of the housing 11, to prevent the package 14 from restricting the thickness of the housing 11.

Some of principal features of the zoom lens 13 constructed in the above-mentioned manner are as follows. The positive lens group L13 of the first lens group G1 to the movable lens group G4 positioned closest to an image side are arranged along the second optical axis ax2, and since the movable lens groups G2 and G4 in particular are arranged along one optical axis ax2, measurement of eccentric error factors in manufacturing as well as correction and adjustment of parts can be readily performed. Furthermore, since the fifth lens group G5 is arranged also on the second optical axis ax2 and no lens groups are arranged on the side of the second prism P2 closer to the image side, the zoom lens 13 has a lens structure which does not easily cause eccentric errors. In addition, the second prism P2 which serves as second optical-axis folding means is arranged on the image side of the fifth lens group G5 which is positioned on the image side of the movable lens group G4 positioned closest to the image side, such that the second optical axis ax2 is prevented from becoming so long as to increase the size of the image capture apparatus 1 excessively.

The construction of the optical system 23 in the image capture apparatus 2 according to the second embodiment will be described below with reference to FIG. 2. The zoom lens 23 includes, in the following order from the object side, the first lens group G1 which is made of the negative lens group L11 having the first optical axis (the entrance optical axis) ax1, the first prism P1, and the positive lens group L13 arranged on the second optical axis ax2 folded laterally approximately 90 degrees by the prism P1, the second lens group G2 which has negative refractive power and moves along the optical axis to mainly perform a zooming action, the third lens group G3 which is fixed on the optical axis and has positive refractive power, the fourth lens group G4 which has positive refractive power and performs focusing as well as correction of variations of an image forming position due to power variations, and the fifth lens group G5 which is fixed on the optical axis and has negative refractive power, the second lens group G2, the third lens group G3, the fourth lens group G4, and the fifth lens group G5 being arranged along the common (second) optical axis ax2. The second prism P2 is arranged at the rear of the zoom lens 23. The second prism P2 has three surfaces, i.e., a transmissive plane P2P in which an entrance surface P2$i$ and an exit surface P2$o$ are positioned and total reflection surfaces P2$ra$ and P2$rb$, the total reflection surfaces P2$ra$ and P2$rb$ forming an angle of approximately 90 degrees. The second optical axis ax2 which has been made incident on the entrance surface P2$i$ is folded downwardly approximately 90 degrees into the third optical axis ax3 by the total reflection surface P2$ra$, and the third optical axis ax3 is folded approximately 90 degrees into the fourth optical axis ax4 approximately parallel to the second optical axis ax2, by the next total reflection surface P2$rb$, and the fourth optical axis ax4 exits from the exit surface P2$o$. Namely, the total reflection surface P2$ra$ serves as second optical-axis folding means, and the total reflection surface P2$rb$ serves as third optical-axis folding means. The third prism P3$r$ is arranged adjacently to or cemented to the second prism P2 such that the fourth optical axis ax4 is folded in a direction approximately parallel to the first optical axis ax1 and is formed into a fifth optical axis ax5. Accordingly, the package 24 of the imager device 25 is arranged so as to be forced against the inside surface of the wide surface 21$a$ of the housing 21 of the image capture apparatus 2, thereby enabling a reduction in the thickness of the image capture apparatus 2.

Some of the principal features of the image capture apparatus 2 according to the second embodiment are as follows. The four-times folding of the optical axis is realized by the three prisms P1, P2 and P3, such that manufacturing costs can be reduced. Since four optical-axis folding means are arranged (two optical-axis folding means P2$ra$ and P2$rb$ are contained in the prism P3), long back focus can be folded into an inconspicuous state such that the housing 11 can be reduced in thickness and its vertical and lateral dimensions can be minimized.

The construction of the optical system 33 in the image capture apparatus 3 according to the third embodiment will be described below with reference to FIG. 2. The zoom lens 33 includes, in the following order from the object side, the first lens group G1 which is made of the negative lens group L11 having the first optical axis (the entrance optical axis) ax1, the first prism P1, and the positive lens group L13 arranged on the second optical axis ax2 folded laterally approximately 90 degrees by the prism P1, the second lens group G2 which has negative refractive power and moves along the optical axis to mainly perform a zooming action, the third lens group G3 which is fixed on the optical axis and has positive refractive power, the fourth lens group G4 which has positive refractive power and performs focusing as well as correction of variations of an image forming position due to power variations, and the fifth lens group G5 which is fixed on the optical axis and has negative refractive power, the second lens group G2, the third lens group G3, the fourth lens group G4, and the fifth lens group G5 being arranged along the common (second) optical axis ax2. Three prisms are arranged at the rear of the zoom lens 33. First, the second optical axis ax2 is folded forwardly approximately 90 degrees into the third optical axis ax3 by the second prism P2, then, the third optical axis ax3 is folded downwardly approximately 90 degrees into the fourth optical axis ax4 by the third prism P3, and finally, the fourth optical axis ax4 is folded in a direction approximately parallel to the second optical axis ax2 by a fourth prism P4$r$ and is formed into the fifth optical axis ax5. Accordingly, the package 34 of the imager device 35 is arranged in a face-to-face relationship with the inside surface of a right-hand (as viewed toward the object side) side wall 31$a$ of the housing 31 of the image capture apparatus 3. Since the optical axis is folded by the second prism P2, a sufficient reduction in the thickness of the image capture apparatus 3 cannot be achieved at that section, but the housing 31 can be projected forward such that a section 31$b$ can be used as a grip section to improve the ease of use of the image capture apparatus 3. The package 34 of the imager device 35 is arranged to be forced against the inside surface of the right-hand wall surface 31$a$ of the grip section 31$b$, thereby preventing an increase in the thickness of the grip section 31$b$.

The zoom lens according to an embodiment of the present invention will be described below.

The zoom lens includes, in the following order from an object side, a first lens group which is made of a negative lens group having a first optical axis, first reflection means for approximately perpendicularly folding the optical axis, and a positive lens group having a second optical axis folded by the first reflection means, and which has positive refractive power as a whole, a second lens group which has negative refractive power and moves along the second optical axis to mainly perform a zooming action, a third lens group which is fixed on the second optical axis and has positive refractive power, a fourth lens group which has positive refractive power and moves along the second optical axis to perform focusing as well as correction of variations of an image forming position due to power variations, a fifth lens group which has negative refractive power and acts to extend a back focus and a composite focal length formed by the first to fourth lens groups, and a plurality of reflection means.

In the zoom lens, if the first reflection means is a reflection surface of a right-angled prism and the right-angled prism has a refractive index nf in order to reduce the loss of the amount of transmitted light while compatibly realizing the miniaturization of the prism and the total reflection thereof, and if the plurality of reflection means arranged on the image side of the fifth lens group includes reflection surfaces of a plurality of prisms containing total reflection surfaces and the prisms have a refractive index nr, it is preferable to satisfy the following conditional formulae (1) and (2):

$$1.8 < nf, \text{ and} \quad (1)$$

$$1.62 < nr. \quad (2)$$

By causing the refractive index of the prism which constitutes the first reflection means to satisfy the conditional formula (1), it is possible to reduce the inclination of principal rays in the prism and to enable miniaturization of the prism. In addition, depending on the angle of view at the wide-angle end and the refractive power of the concave lens group on the first optical axis, the refractive index of the prism total reflection can be increased to ensure total reflection and reduce the loss of the amount of transmitted light.

In addition, if total reflection is to be established at each of the second, third and fourth reflection surfaces, the refractive indexes of the second prism and the following prisms need to be increased. Since the inclination of principal rays at each of the second prism and the following prisms is small compared to the first prism, total reflection at each of the second prism and the following prisms is possible by selecting prisms having the irrespective refractive indexes so as to satisfy the conditional formula (2). Although the refractive index of each of the second prism and the following prisms may also satisfy the conditional formula (1) similarly to the refractive index of the first prism, optical glass which has a low chromatism and a high refractive index is generally expensive, and it is desirable to adopt glass which has a low refractive index to such an extent that total reflection can be established.

In the zoom lens, the negative lens group of the first lens group having the above-mentioned first optical axis is preferably formed by a single concave meniscus lens having a convex surface facing the object side. If the lens groups positioned on the first optical axis are formed by only one concave lens, the depthwise length of the lens can be minimized. Such zoom lens is suitable for use as a zoom lens which has an angle of view of not greater than 65 degrees at its wide-angle end and a zoom ratio of approximately 2 to 4.

In addition, if the negative lens group of the first lens group having the first optical axis is formed of one concave lens and two concave meniscus lenses each having a convex surface facing the object side, the zoom lens can be adapted to suit a construction able to be set to an angle of view of not less than 70 degrees at the wide-angle end. Accordingly, negative refractive power can be distributed to the two concave lenses to reduce distortion occurring from the negative lenses, an over-curvature of field, and a chromatic difference of magnification, and furthermore, a convex lens can be arranged at a location closest to the object side to cancel and correct such aberrations.

In the zoom lens, the positive lens group having the second optical axis, which is included in the first lens group, is made of a cemented lens which includes a convex lens, a concave lens and a convex lens arranged in order of mention from the object side, the second lens group is made of two concave lenses and one convex lens arranged in order of mention from the object side, the third lens group is made of one convex lens, the fourth lens group is made of a cemented lens which includes a convex lens and a concave lens, and the fifth lens group is made of a cemented lens which includes a concave lens and a convex lens. If it is assumed that v113a represents the Abbe number of the convex lens that is positioned at a location closest to the object side and constitutes part of the positive lens group of the first lens group, and that v113c represents the Abbe number of the convex lens of the cemented lens that constitutes part of the positive lens group of the first lens group, it is preferable to satisfy the following conditional formulae (3) and (4):

$$v113a<30, \text{ and} \tag{3}$$

$$v113c<55. \tag{4}$$

Accordingly, since the lens construction arranged at the rear of the first reflection means can be formed of a minimum number of lens elements, it is possible to realize long back focus while compatibly realizing reductions in the size and the cost of the zoom lens. Particularly, the positive lens group of the first lens group having the second optical axis can achieve the same aberration correction whether the lenses are arranged in the order of a convex lens, a concave lens and a convex lens from the object side, as in the construction of the zoom lens or in the order of a concave lens, a convex lens and a convex lens from the object side, but the construction of the zoom lens is advantageous in terms of the miniaturization of the first prism. There is a case where when the first prism is made small, the concave lens group of the first lens group having the first optical axis and the positive lens group of the first lens group having the folded second optical axis interfere with each other. In order to avoid the collision of the lenses, it is effective to cut the external shape of either one of the lenses (herein after referred to as "D-cut"). However, if the concave surface of a lens is D-cut, the cut surface and the mirror surface form an acute angle and the ridgeline becomes difficult to bevel, so that issues of workability and handling arise. If the D-cut section is a convex surface, the cut surface and the mirror form an obtuse angle, so that such issues do not occur. Only the lens closest to the prism in the positive lens group of the first lens group interferes with the negative lens group of the first lens group, so that if a convex lens is arranged at that position and a cemented lens including a concave lens and a convex lens is arranged at a position where the D-cut is not needed, it is possible to minimize the size of the first prism. In addition, since the first lens group is constructed such that the negative lens group and the positive lens group are arranged to be separate from each other across the prism, it is important to construct the first lens group such that a chromatic difference of magnification on the wide-angle side and an axial chromatic aberration on the telephoto side which occur from the first lens group can be corrected with good balance.

The above-mentioned conditional formula (3) is intended to correct a chromatic difference of magnification on the wide-angle side, and in the negative lens group, the ray height of its principal rays is large on the wide-angle side, such that the action of bending rays inwardly of an image height more strongly acts on rays of shorter wavelength. In order to correct the chromatic difference of magnification, it is necessary to reduce the Abbe number of the medium of the convex lens to a moderately small value (high dispersion) thereby better to dispersing principal rays of short wavelength. On the other hand, on the telephoto side, the state of correction of the axial chromatic aberration of the first lens group is a significant factor in the axial chromatic aberration of the image plane because the power of the second lens group and the following lens groups, so that the state of correction of the axial chromatic aberration is important to a partial system of the first lens group. The concave lens on the object side and the convex lens on the image side, both of which allow the ray height of an axial bundle to become high on the telephoto side, need to use a medium which is disadvantageous in terms of the correction of axial chromatic aberration, on the basis of the condition of the conditional formula (3). Accordingly, the Abbe number of the medium of the convex lens on the image side needs to satisfy the conditional formula (4) and satisfactorily correct the axial chromatic aberration of the first lens group.

Furthermore, if it is assumed that β2T represents the transverse magnification of the second lens group at the telephoto end, β5 represents the transverse magnification of the fifth lens group, f3 represents the focal length of the third lens group, and f5 represents the focal length of the fifth lens group, the zoom lens desirably satisfies the following conditional formulae (5), (6) and (7):

$$0.65<|β2T|<1.1, \tag{5}$$

$$β5<1.2, \text{ and} \tag{6}$$

$$|f5/f3|<2.2. \tag{7}$$

The conditional formula (5) is intended to reduce the effective diameter of the positive lens group of the first lens group, and if the value of |β2T| exceeds the upper limit, the total length of the lens system becomes small, but the effective diameter of the positive lens group of the first lens group becomes large. If the value of |β2T| exceeds the lower limit, it becomes difficult to obtain a zoom ratio of approximately 3.

The conditional formula (6) is intended to miniaturize the first lens group to the fourth lens group. The refractive power arrangement between the first lens group and the fourth lens group is selected such that strong refractive powers are arranged as a whole to cause the refractive power arrangement to suit a picture size smaller than that of an actual imager device, and the conditional formula (6) can enlarge the focal length, the back focus and the picture size of the first to fourth lens groups, thereby achieving a reduction in the thickness of the image capture apparatus.

The conditional formula (7) is intended to prevent large aberrations from occurring from the fifth lens group, while ensuring a long back focus. By weakening the refractive power of the fifth lens group with respect to the third lens group as in the conditional formula (7), it is possible to obtain the advantage of ensuring the magnification specified in the conditional formula (6) without hindering the entire aberration correction.

Figure 4:
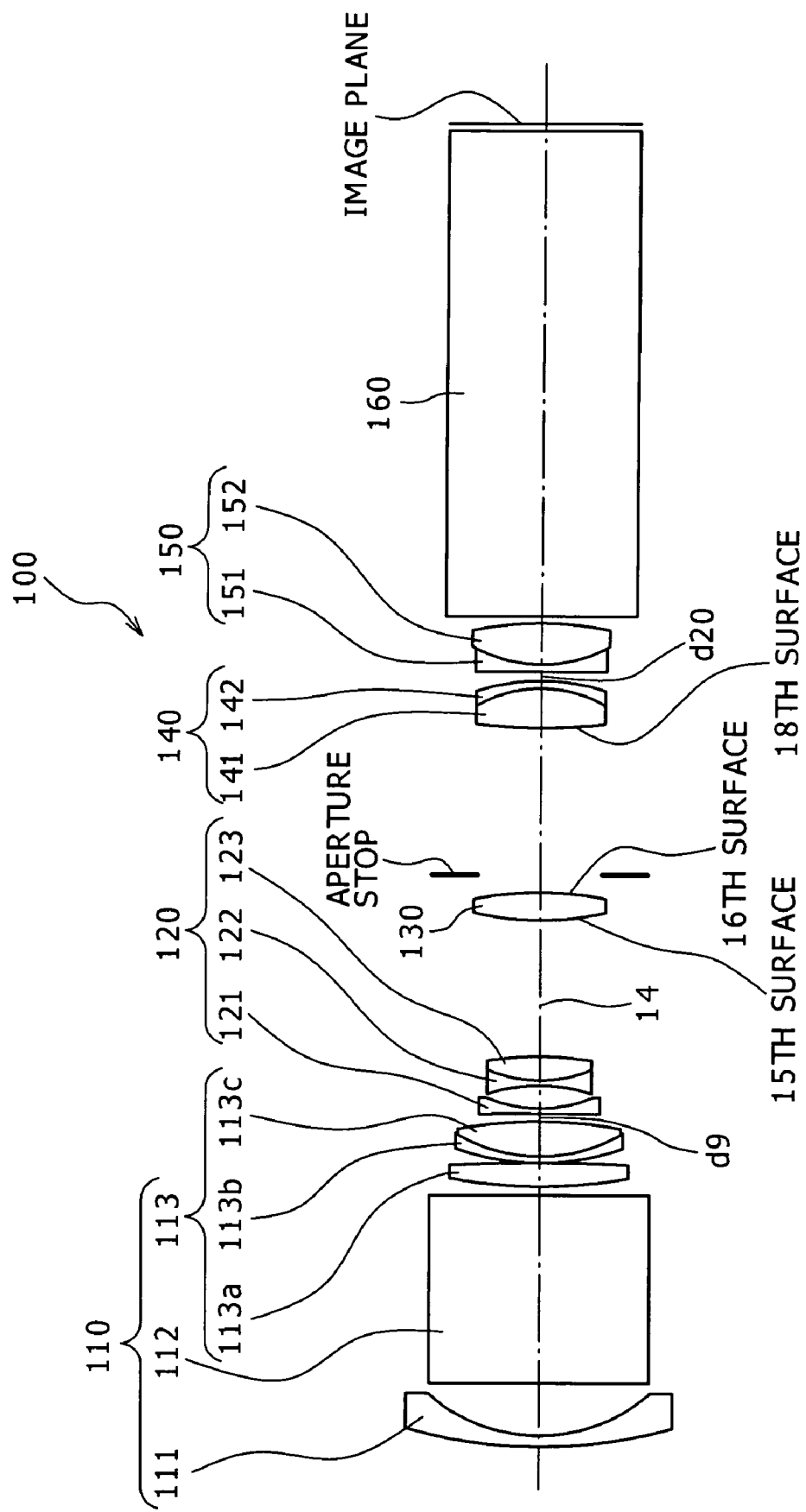
FIG. 4 is a schematic view showing the lens construction of a first embodiment of the zoom lens.
Figure 8:
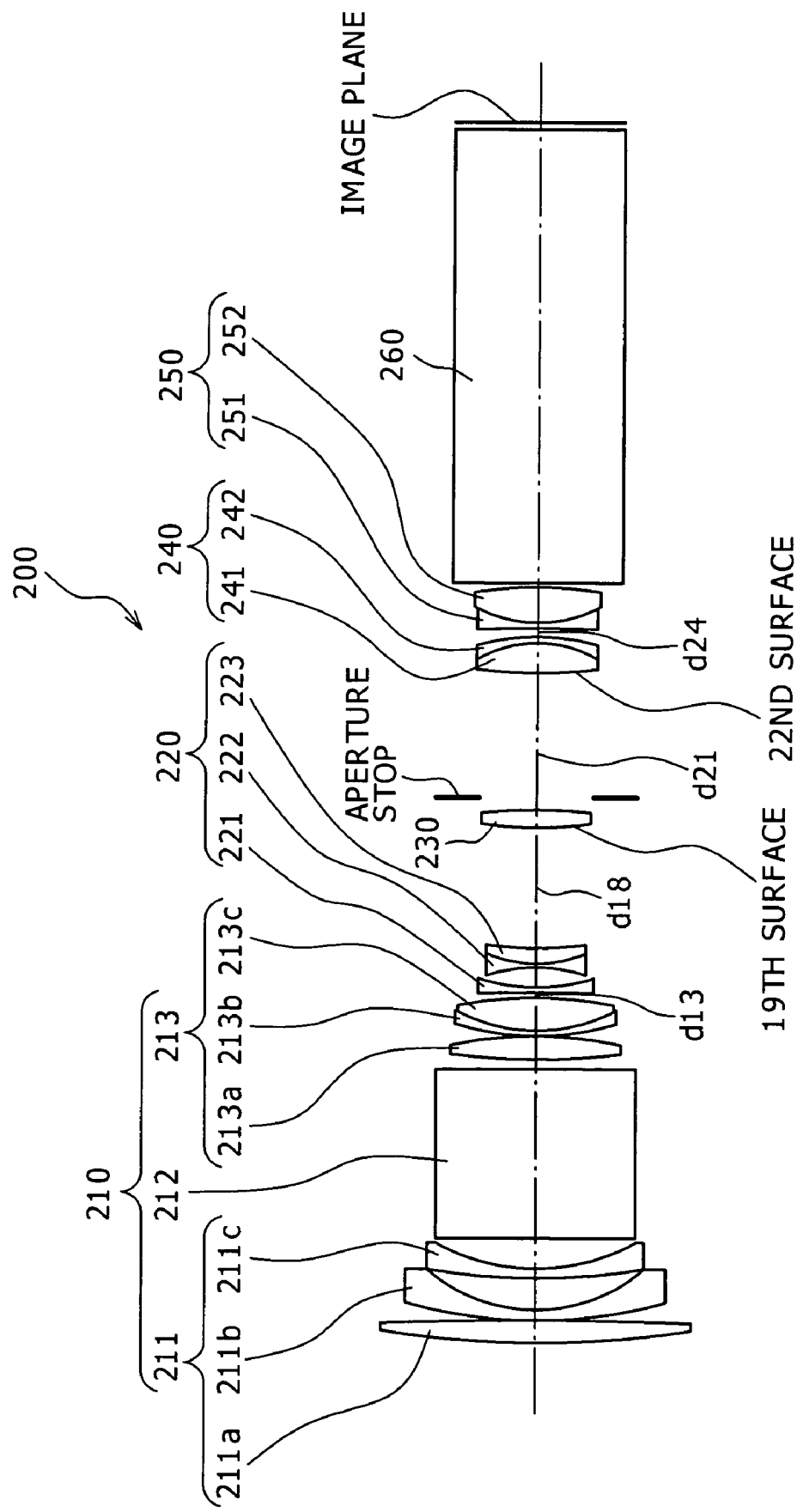
FIG. 8 is a schematic view showing the lens construction of a second embodiment of the zoom lens.

FIGS. 4 and 8 are schematic views respectively showing first and second embodiments of the zoom lens. Irrespective of specific numerical embodiments that will be mentioned later, it is possible to apply either of the embodiments to any of the first to third embodiments of the image capture apparatus by appropriately modifying the angle of view at the wide-angle end and the zoom ratio within the range of design matters.

FIG. 4 schematically shows the lens arrangement of a zoom lens 100 according to the first embodiment of the zoom lens. The zoom lens 100 includes, in the following order from its object side, a first lens group 110 having positive refractive power, a second lens group 120 which has negative refractive power and moves along the optical axis to mainly perform a zooming action, a third lens group 130 which has positive refractive power and is fixed on the optical axis, a fourth lens group 140 which has positive refractive power and moves along the optical axis to perform focusing as well as correction of variations of an image forming position due to power variations, a fifth lens group 150 which has negative refractive power and is fixed on the optical axis and acts to extend a back focus and a composite focal length formed by the first lens group 110 to the fourth lens group 140, and a plurality of prisms 160 and the like.

The first lens group 110 is formed of a negative lens group 111, a prism 112, and a positive lens group 113. The negative lens group 111 is made of a concave lens having a convex surface facing the object side, and the positive lens group 113 is made of a cemented lens including a convex lens 113a, a concave lens 113b, and a convex lens 113c. The second lens group 120 is made of a cemented lens including a concave lens 121, a concave lens 122, and a convex lens 123. The third lens group 130 is made of one convex lens having aspherical surfaces on both sides, the fourth lens group 140 is made of a convex lens 141 having an aspherical surface on the object side and a concave lens 142, and the fifth lens group 150 is made of a cemented lens including a concave lens 151 and a convex lens 152. A plane-parallel plate representing a combined construction of the plurality of prisms 160, an infrared cut filter, an optical low-pass filter, and the like is arranged between the fifth lens group 150 and the image plane. An aperture stop is arranged on the image-plane side of the third lens group 130 and is fixed during power variation.

In the zoom lens 100 according to the first embodiment of the zoom lens, as well as a zoom lens 200 according to the second embodiment of the zoom lens, an aspherical surface is used, and the aspherical surface is defined by the following formula 1:

$$xi-j = H^2/ri-j\{1+\sqrt{(1-H^2/ri-j^2)}\} + \Sigma AkH^k \qquad \text{[Formula 1]}$$

In the formula 1, "xi–j" represents the depth of the aspherical surface, and "H" represents the height from the optical axis.

Table 1 shows the specifications of a first numerical embodiment in which specific numerical values are applied to the zoom lens 100 according to the first embodiment of the zoom lens. In Table 1 showing the specifications, optical elements are respectively denoted by reference numerals attached to the individual optical elements in FIG. 4, each surface number denotes the i-th surface counted from the object side of all the optical elements, a radius of curvature R denotes the paraxial radius of curvature of the i-th surface counted from the object side, a surface separation d denotes the axial surface separation between the i-th surface and the (i+1)-th surface counted from the object side, a refractive index nd denotes the refractive index relative to d-line (λ=587.6 nm) of a glass member having on the object side the i-th surface counted from the object side, and an Abbe number vd denotes the Abbe number relative to the d-line of the glass member having on the object side the i-th surface counted from the object side. In addition, infinity (∞) in the radius of curvature r represents that the corresponding i-th surface is a flat surface.

TABLE 1

| OPTICAL ELEMENT | SURFACE NUMBER | RADIUS OF CURVATURE r | SURFACE SEPARATION d | REFRACTIVE INDEX nd | ABBE NUMBER vd |
|---|---|---|---|---|---|
| 111 | 1 | 53.623 | 1.500 | 1.83481 | 42.7 |
|  | 2 | 23.065 | 7.408 | 1. |  |
| 112 | 3 | ∞ | 27.285 | 1.83400 | 37.3 |
|  | 4 | ∞ | 1.500 | 1. |  |
| 113a | 5 | 67.408 | 3.200 | 1.80518 | 25.5 |
|  | 6 | −500.000 | 0.200 | 1. |  |
| 113b | 7 | 41.132 | 1.000 | 1.92286 | 20.9 |
| 113c | 8 | 25.000 | 4.800 | 1.51680 | 64.2 |
|  | 9 | −48.748 | VARIABLE | 1. |  |
| 121 | 10 | ∞ | 1.000 | 1.90366 | 31.3 |
|  | 11 | 18.661 | 3.103 | 1. |  |
| 122 | 12 | −26.274 | 0.900 | 1.65844 | 50.9 |
| 123 | 13 | 20.000 | 3.195 | 1.84666 | 23.8 |
|  | 14 | −158.413 | VARIABLE | 1. |  |

TABLE 1-continued

| OPTICAL ELEMENT | SURFACE NUMBER | RADIUS OF CURVATURE r | SURFACE SEPARATION d | REFRACTIVE INDEX nd | ABBE NUMBER vd |
|---|---|---|---|---|---|
| 130 | 15 | 34.008 | 3.829 | 1.6935 | 53.5 |
| | 16 | −100.054 | 2.500 | 1. | |
| APERTURE STOP | 17 | ∞ | VARIABLE | 1. | |
| 141 | 18 | 70.026 | 5.531 | 1.62263 | 58.2 |
| 142 | 19 | −23.136 | 1.000 | 1.80518 | 25.5 |
| | 20 | −43.577 | VARIABLE | 1. | |
| 151 | 21 | −194.785 | 1.000 | 1.90366 | 31.3 |
| 152 | 22 | 20.148 | 5.500 | 1.58144 | 40.9 |
| | 23 | −44.873 | 1.3925 | 1. | |
| 160 ETC. | 24 | ∞ | 67.5 | 1.65844 | 50.9 |
| | 25 | ∞ | 1.000 | 1. | |
| IMAGE PLANE | 26 | ∞ | | | |

In the zoom lens 100, both surfaces (the 15th and 16th surfaces) of the third lens group 130 and the object-side surface (the 18th surface) of the fourth lens group 140 are respectively formed of aspherical surfaces. Table 2 shows the 4th-, 6th- and 8th-order aspherical coefficients A4, A6 and A8 of the respective surfaces in the first numerical embodiment. In addition, in each of Table 2 and the following tables showing aspherical coefficients, "e-i" is an exponential representation which is to base 10, i.e., "10-i"; for example, "0.26029e−05" represents "0.26029×10-5".

TABLE 2

| SURFACE NUMBER | A4 | A6 | A8 |
|---|---|---|---|
| 15 | −0.63642e−05 | | |
| 16 | +0.11792e−05 | +0.61045e−08 | −0.32063e−10 |
| 18 | −0.50111e−05 | +0.34937e−08 | −0.38392e−10 |

In the zoom lens 100, the surface separation d9 between the first lens group 110 and the second lens group 120, the surface separation d14 between the second lens group 120 and the third lens group 130, the surface separation d17 between the aperture stop and the fourth lens group 140, and the surface separation d20 between the fourth lens group 140 and the fifth lens group 150 vary during power variation. The values of the respective surface separations in the first numerical embodiment during its wide-angle end state (f=21.50), its intermediate focal length state (f=36.57) and its telephoto end state (f=63.44) are shown in Table 3 along with focal lengths, F-numbers and angles of view (2ω).

TABLE 3

| FOCAL LENGTH | 21.50 | 36.57 | 63.44 |
|---|---|---|---|
| F NUMBER | 3.60 | 3.87 | 4.87 |
| 2ω(DEGREE) | 63.2 | 38.0 | 22.4 |
| d 9 | 1.000 | 11.364 | 19.900 |
| d 14 | 19.700 | 9.336 | 0.800 |
| d 17 | 21.444 | 12.934 | 5.414 |
| d 20 | 1.500 | 10.010 | 17.530 |

The constituent elements between the 24th surface and the 25th surface are shown as being replaced with a plane-parallel plate representative of a combination of a plurality of prisms, an infrared cut filter, an optical low-pass filter, a cover glass for the package of an imager device and the like. When the first numerical embodiment is to be applied to any of the first, second and third embodiments of the image capture apparatus, the ratio of the air separations to the thickness of the plane-parallel plate may be modified, and the radii of curvature, the surface separations, the aspherical coefficients and the like may be appropriately modified.

Figure 5:
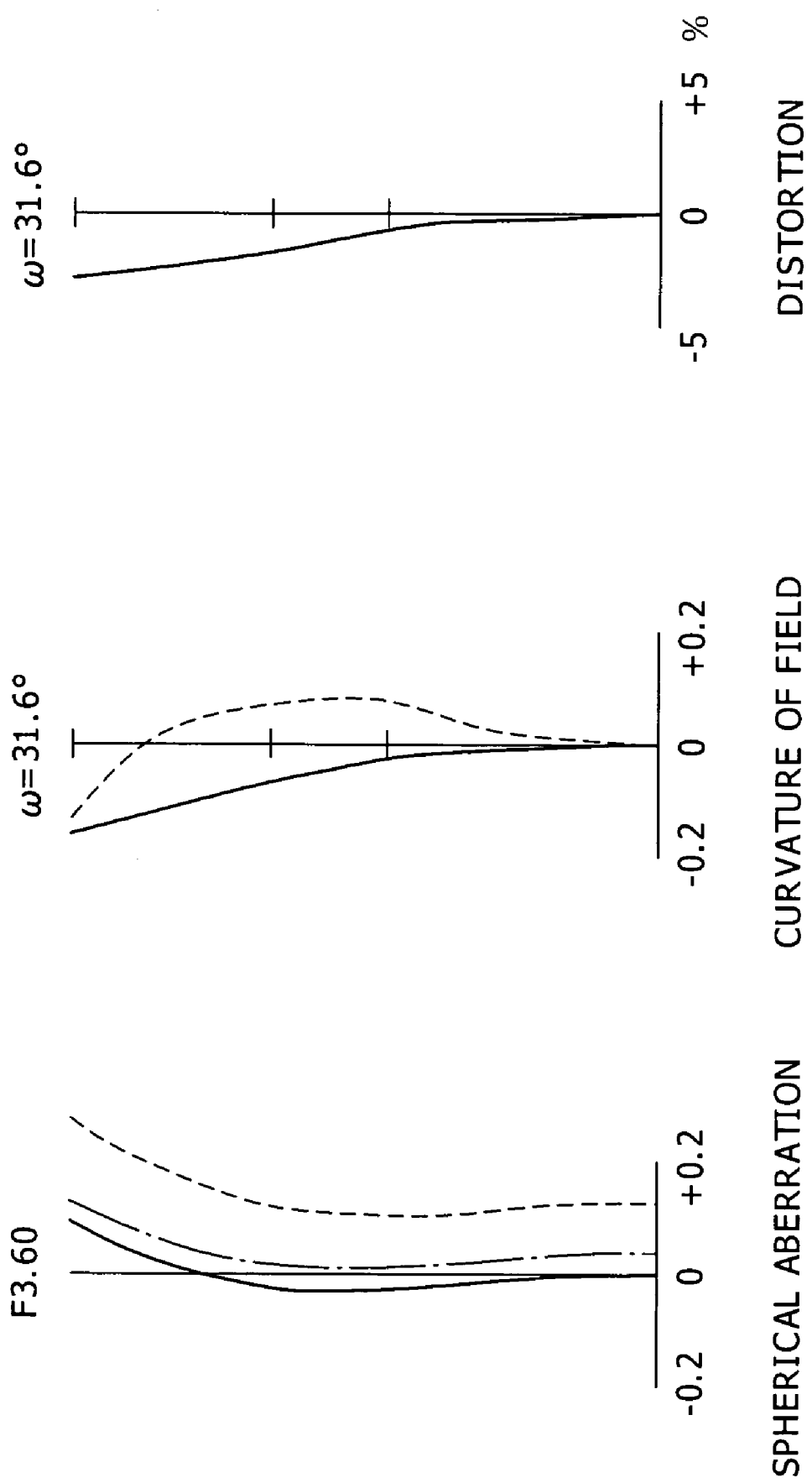
FIG. 5 is a graph showing, along with FIGS. 6 and 7, various aberrations of a first numerical embodiment obtained by applying specific numerical values to the first embodiment of the zoom lens, FIG. 5 showing a spherical aberration, a curvature of field and a distortion measured during the wide-angle end state of the first embodiment.
Figure 6:
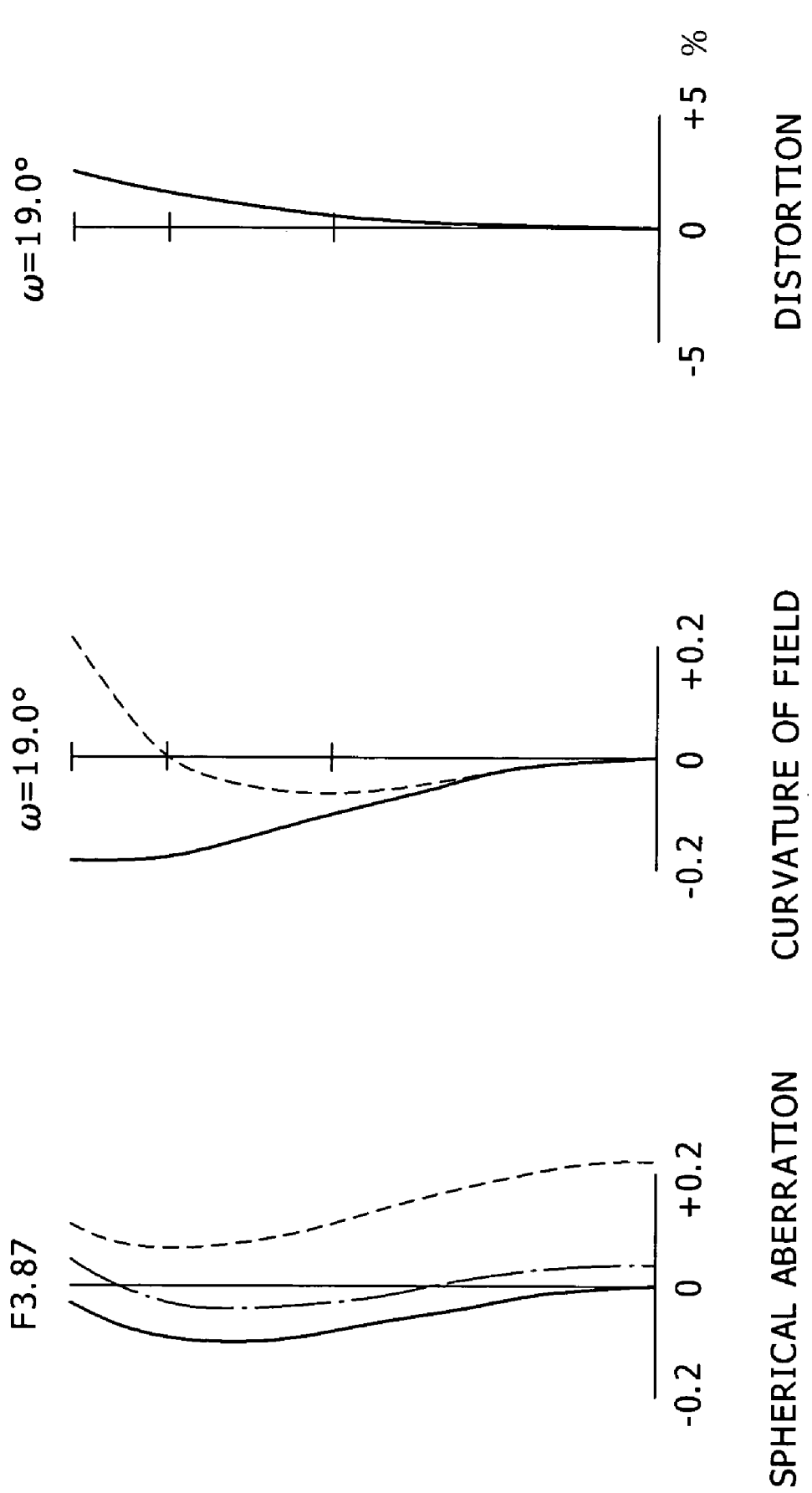
FIG. 6 is a graph showing a spherical aberration, a curvature of field and a distortion measured during the intermediate focal length state of the first embodiment.
Figure 7:
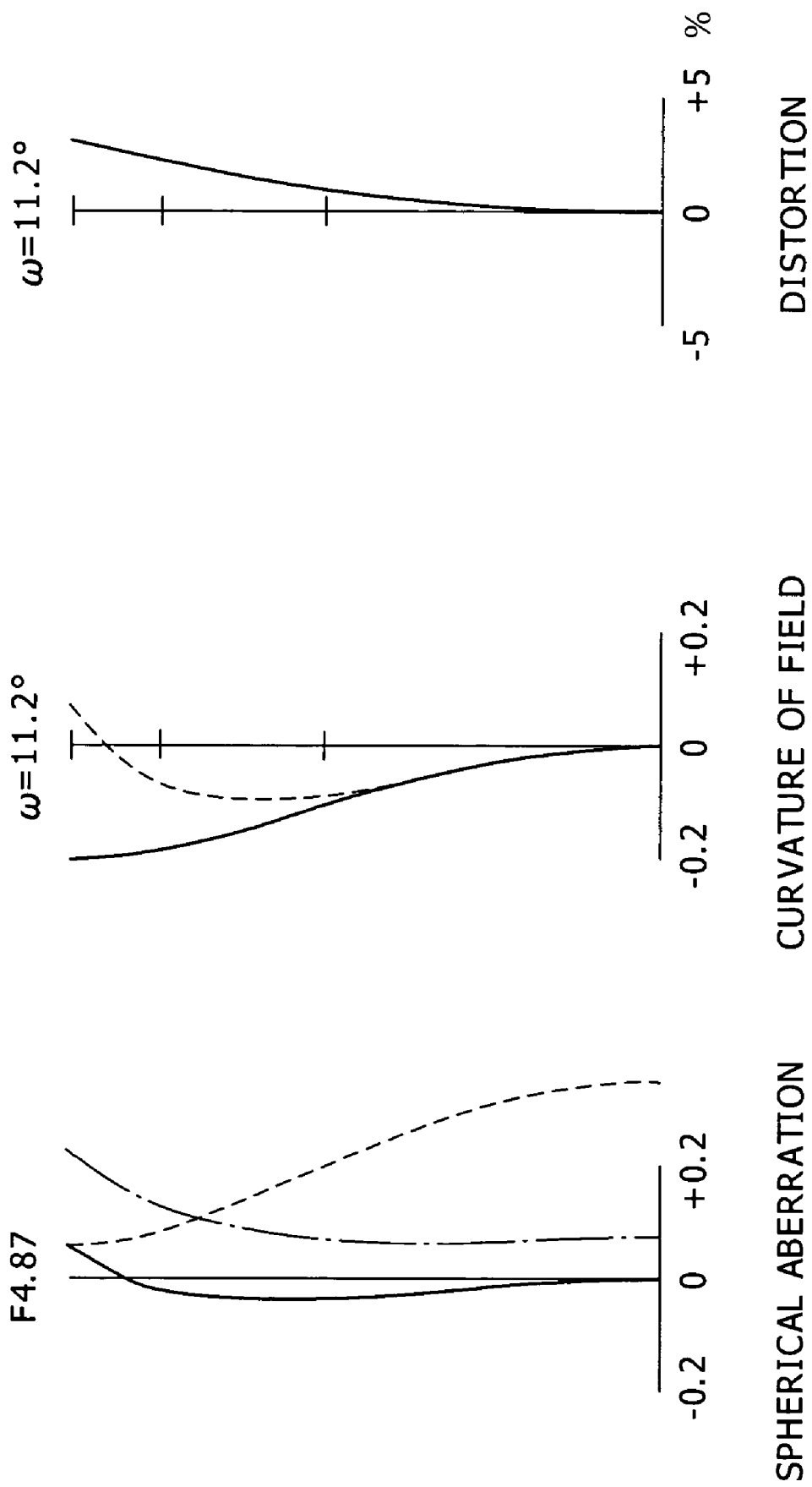
FIG. 7 is a graph showing a spherical aberration, a curvature of field and a distortion measured during the telephoto end state of the first embodiment.

Each of FIGS. 5 to 7 shows a spherical aberration, a curvature of field and a distortion in the first numerical embodiment which is in focus at infinity. FIG. 5 shows the aberrations measured during the wide-angle end state (f=21.50), FIG. 6 shows the aberrations measured during the intermediate focal length state (f=36.57), and FIG. 7 shows the aberrations measured during the telephoto end state (f=63.44). In the spherical-aberration graph of each of FIGS. 5 to 7, a solid line represents specific values at d-line (λ=587.6 nm), a dashed line represents specific values at g-line (λ=435.84 nm), and a dot-dashed line represents specific values at C-line (λ=656.28 nm). In the curvature-of-field graph of each of FIGS. 5 to 7, a solid line represents a sagittal image plane and a dashed line represents a meridional image plane.

As can be seen from FIGS. 5 to 7, the first numerical embodiment is satisfactorily corrected for the aberrations and has superior image forming performance.

FIG. 8 schematically shows the lens arrangement of a zoom lens 200 according to the second embodiment of the zoom lens. The zoom lens 200 includes, in the following order from its object side, a first lens group 210 having positive refractive power, a second lens group 220 which has negative refractive power and moves along the optical axis to mainly perform a zooming action, a third lens group 230 which has positive refractive power and is fixed on the optical axis, a fourth lens group 240 which has positive refractive power and moves along the optical axis to perform focusing as well as correction of variations of an image forming position due to power variations, a fifth lens group 250 which has negative refractive power and is fixed on the optical axis and acts to extend a back focus and a composite focal length formed by the first lens group 210 to the fourth lens group 240, and a plurality of prisms 260 and the like.

The first lens group 210 is formed of a negative lens group 211, a prism 212, and a positive lens group 213. The negative lens group 211 is made of a convex lens 211a and two meniscus concave lenses 211b and 211c each having a concave surface facing the object side, and the positive lens group 213 is made of a cemented lens including a convex lens 213a, a concave lens 213b, and a convex lens 213c. The second lens group 220 is made of a cemented lens including a concave lens 221, a concave lens 222, and a convex lens 223. The third lens group 230 is made of one convex lens having an aspherical surface on the object side, the fourth lens group 240 is made of a cemented lens including a convex lens 241 having an aspherical surface on the object side and a concave lens 242, and the fifth lens group 250 is made of a cemented lens including a concave lens 251 and a convex lens 252. A plane-parallel plate representing a combined construction of the plurality of prisms 260, an infrared cut filter, an optical low-pass filter, and the like is arranged between the fifth lens group 250 and the image plane. An aperture stop is arranged on the image-plane side of the third lens group 230 and is fixed during power variation.

Table 4 shows the specifications of a second numerical embodiment in which specific numerical values are applied to the zoom lens 200 according to the second embodiment of the zoom lens.

TABLE 4

| OPTICAL ELEMENT | SURFACE NUMBER | RADIUS OF CURVATURE r | SURFACE SEPARATION d | REFRACTIVE INDEX nd | ABBE NUMBER vd |
|---|---|---|---|---|---|
| 211a | 1 | 178.908 | 3.090 | 1.51742 | 52.2 |
|  | 2 | ∞ | 0.200 | 1. |  |
| 211b | 3 | 66.286 | 1.500 | 1.80420 | 46.5 |
|  | 4 | 24.894 | 5.573 | 1. |  |
| 211c | 5 | 87.956 | 1.500 | 1.80420 | 46.5 |
|  | 6 | 32.071 | 5.551 | 1. |  |
| 212 | 7 | ∞ | 28.094 | 1.83400 | 37.3 |
|  | 8 | ∞ | 1.000 | 1. |  |
| 213a | 9 | 62.786 | 3.881 | 1.75520 | 27.5 |
|  | 10 | −89.544 | 0.200 | 1. |  |
| 213b | 11 | 39.747 | 1.000 | 1.92286 | 20.9 |
| 213c | 12 | 21.225 | 5.379 | 1.62041 | 60.3 |
|  | 13 | −82.747 | VARIABLE | 1. |  |
| 221 | 14 | ∞ | 1.000 | 1.88300 | 40.8 |
|  | 15 | 28.164 | 3.060 | 1. |  |
| 222 | 16 | −34.400 | 0.900 | 1.88300 | 40.8 |
| 223 | 17 | 19.006 | 2.645 | 1.92286 | 20.9 |
|  | 18 | 100.000 | VARIABLE | 1. |  |
| 230 | 19 | 40.496 | 2.926 | 1.73077 | 40.5 |
|  | 20 | −88.722 | 2.500 | 1. |  |
| APERTURE STOP | 21 | ∞ | VARIABLE | 1. |  |
| 241 | 22 | 74.106 | 4.515 | 1.69350 | 53.2 |
| 242 | 23 | −21.667 | 1.000 | 1.84666 | 23.8 |
|  | 24 | −40.381 | VARIABLE | 1. |  |
| 251 | 25 | −16337.010 | 1.000 | 1.90366 | 31.3 |
| 252 | 26 | 20.000 | 5.663 | 1.58144 | 40.9 |
|  | 27 | −78.420 | 1.019 | 1. |  |
| 260 ETC. | 28 | ∞ | 74.3 | 1.65844 | 50.9 |
|  | 29 | ∞ | 1.000 | 1. |  |
| IMAGE PLANE | 30 | ∞ |  |  |  |

In the zoom lens 200, the object-side surface (the 19th surface) of the third lens group 230 and the object-side surface (the 22nd surface) of the fourth lens group 240 are respectively formed of aspherical surfaces. Table 5 shows the 4th-, 6th- and 8th-order aspherical coefficients A4, A6 and A8 of the respective surfaces in the second numerical embodiment.

TABLE 5

| SURFACE NUMBER | A4 | A6 | A8 |
|---|---|---|---|
| 19 | −0.67074e−05 | −0.27247e−08 | +0.19894e−10 |
| 22 | −0.51030e−05 | +0.10135e−07 | −0.41407e−10 |

In the zoom lens 200, the surface separation d13 between the first lens group 210 and the second lens group 220, the surface separation d18 between the second lens group 220 and the third lens group 230, the surface separation d21 between the aperture stop and the fourth lens group 240, and the surface separation d24 between the fourth lens group 240 and the fifth lens group 250 vary during power variation. The values of the respective surface separations in the second numerical embodiment during its wide-angle end state (f=17.02), its intermediate focal length state (f=34.04) and its telephoto end state (f=63.42) are shown in Table 6 along with focal lengths, F-numbers and angles of view (2ω).

TABLE 6

| FOCAL LENGTH | 17.02 | 34.04 | 63.42 |
|---|---|---|---|
| F NUMBER | 3.60 | 4.05 | 5.23 |
| 2ω(DEGREE) | 76.6 | 40.6 | 22.4 |
| d 13 | 1.000 | 12.128 | 20.235 |
| d 18 | 20.035 | 8.907 | 0.800 |

TABLE 6-continued

| d 21 | 20.771 | 11.435 | 5.402 |
|---|---|---|---|
| d 24 | 1.700 | 11.036 | 17.069 |

The constituent elements between the 28th surface and the 29th surface are shown as being replaced with a plane-parallel plate representative of a combination of a plurality of prisms, an infrared cut filter, an optical low-pass filter, a cover glass for the package of an imager device and the like. When the second numerical embodiment is to be applied to any of the first, second and third embodiments of the image capture apparatus, the ratio of the air separations to the thickness of the plane-parallel plate may be modified, and the radii of curvature, the surface separations, the aspherical coefficients and the like may be appropriately modified.

Figure 9:
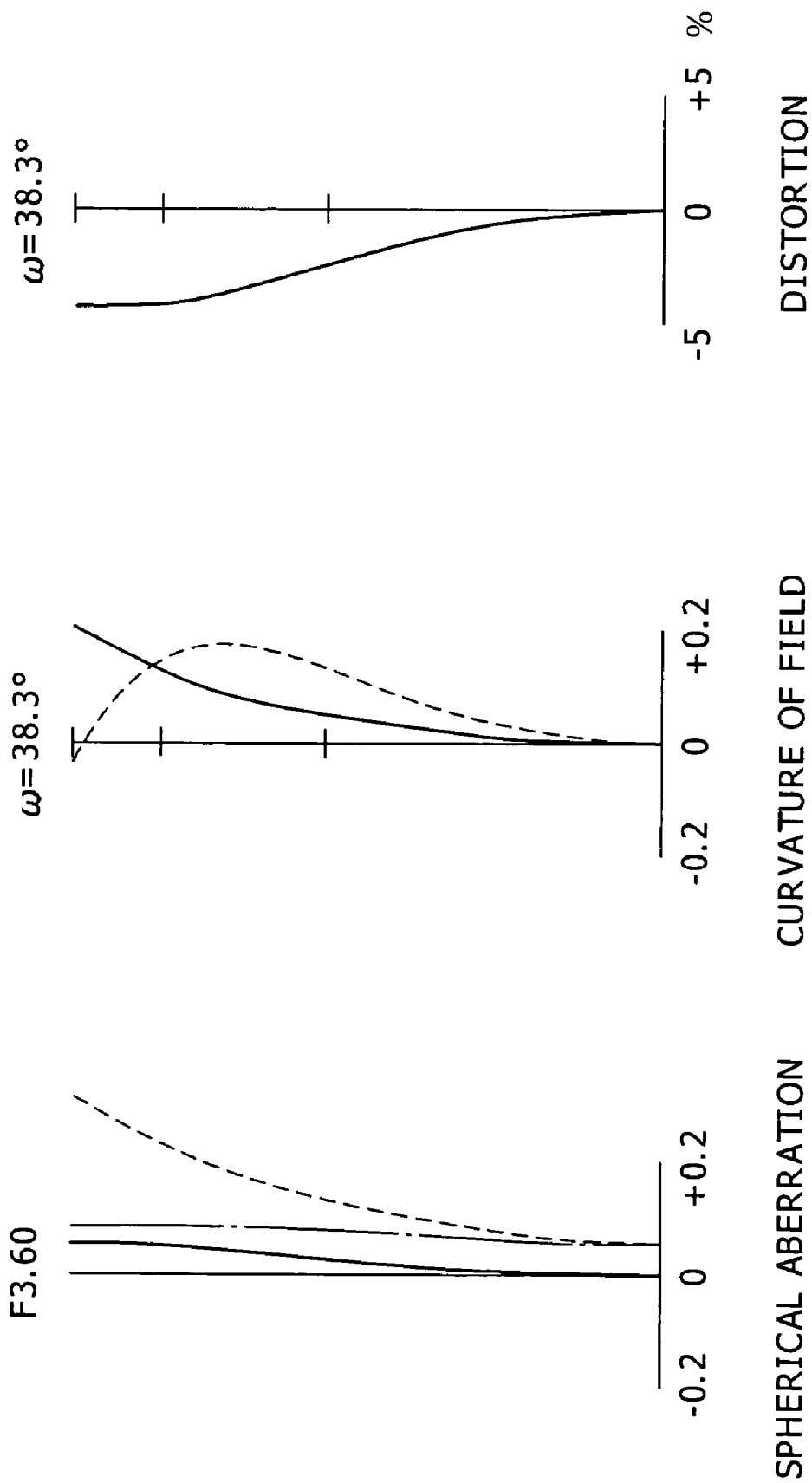
FIG. 9 is a graph showing, along with FIGS. 10 and 11, various aberrations of a second numerical embodiment obtained by applying specific numerical values to the second embodiment of the zoom lens, FIG. 9 showing a spherical aberration, a curvature of field and a distortion measured during the wide-angle end state of the second embodiment.
Figure 10:
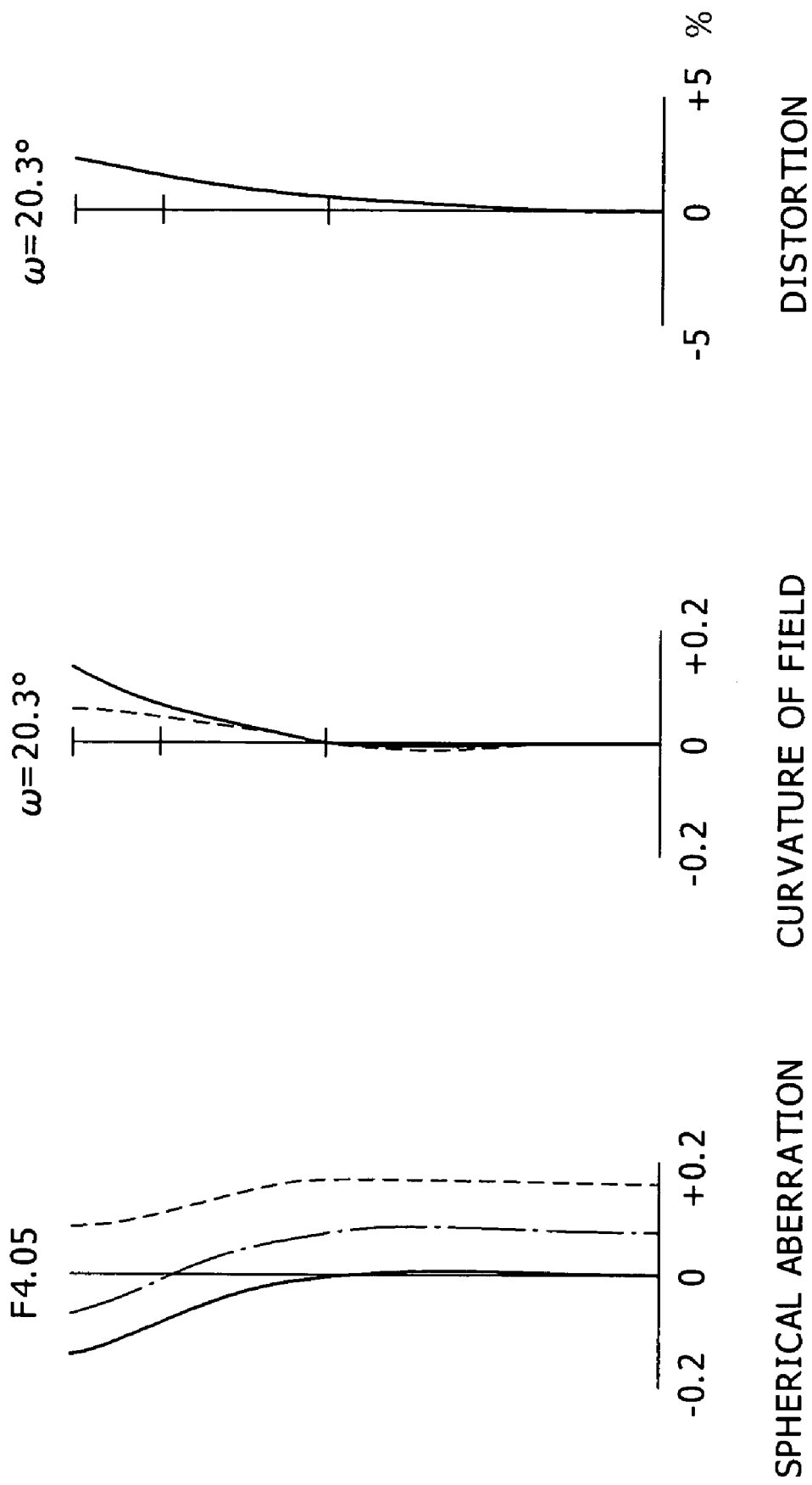
FIG. 10 is a graph showing a spherical aberration, a curvature of field and a distortion measured during the intermediate focal length state of the second embodiment.
Figure 11:
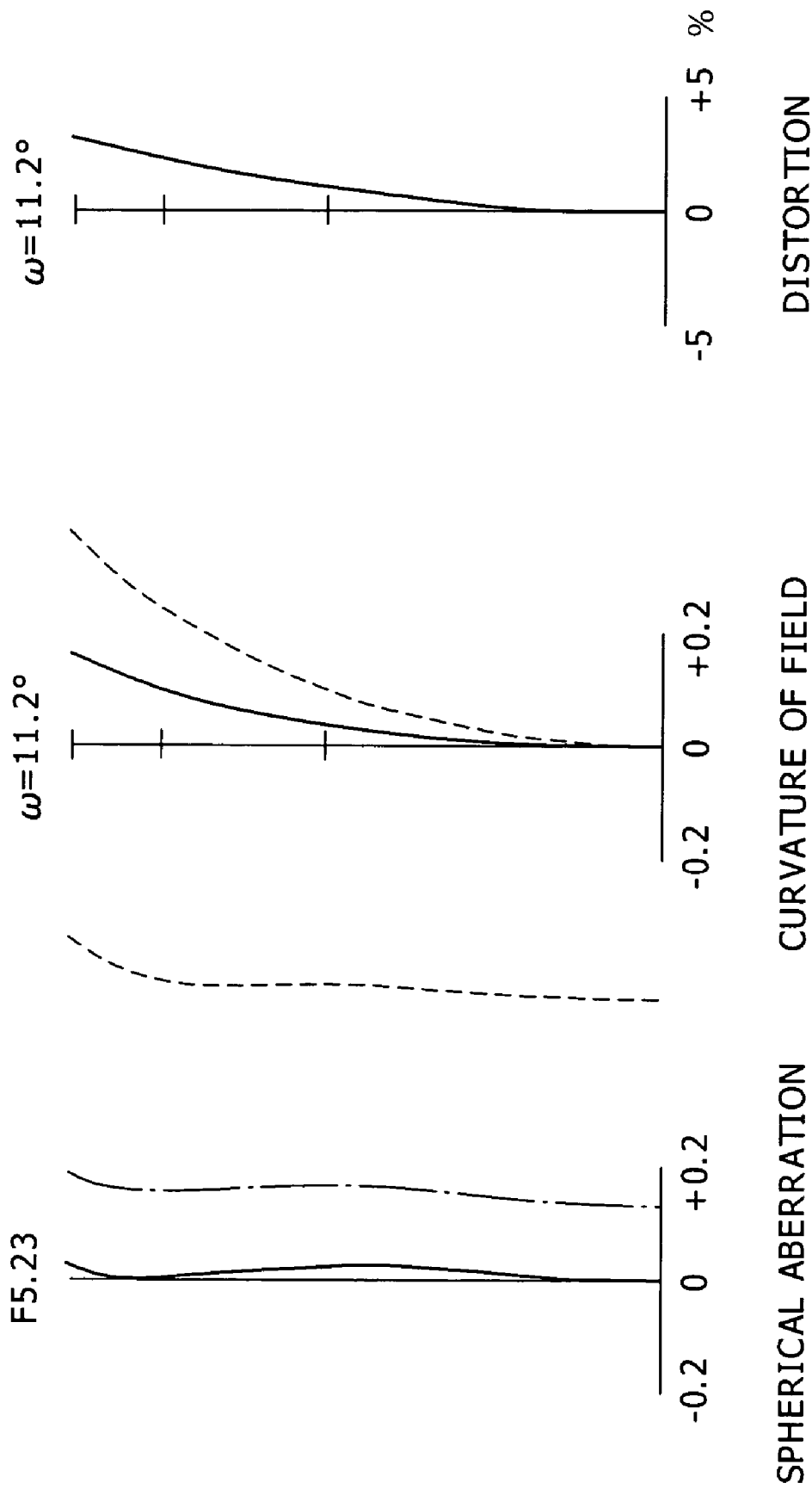
FIG. 11 is a graph showing a spherical aberration, a curvature of field and a distortion measured during the telephoto end state of the second embodiment.

Each of FIGS. 9 to 11 shows a spherical aberration, a curvature of field and a distortion in the second numerical embodiment which is in focus at infinity. FIG. 9 shows the aberrations measured during the wide-angle end state (f=17.02), FIG. 10 shows the aberrations measured during the intermediate focal length state (f=34.04), and FIG. 11 shows the aberrations measured during the telephoto end state (f=63.42). In the spherical-aberration graph of each of FIGS. 9 to 11, a solid line represents specific values at d-line (λ=587.6 nm), a dashed line represents specific values at g-line (λ=435.84 nm), and a dot-dashed line represents specific values at C-line (λ=656.28 nm). In the curvature-of-field graph of each of FIGS. 9 to 11, a solid line represents a sagittal image plane and a dashed line represents a meridional image plane.

As can be seen from FIGS. 9 to 11, the second numerical embodiment is satisfactorily corrected for the aberrations and has superior image forming performance.

Table 7 shows values corresponding to the conditional formulae (1) to (5) of the first and second numerical embodiments.

TABLE 7

| CONDITIONAL FORMULA | NUMERICAL EMBODIMENT 1 | NUMERICAL EMBODIMENT 2 |
|---|---|---|
| (1) ν113a | 25.5 | 27.5 |
| (2) ν113c | 64.2 | 60.3 |
| (3) β2T | −0.797 | −0.971 |
| (4) β5 | 1.365 | 1.448 |
| f3 | 37.03 | 38.42 |
| f5 | −148.13 | −120.15 |
| (5) \|f5/f3\| | 4.00 | 3.13 |

Both the first and second numerical embodiments satisfy the conditional formulae (1) to (5).

The shapes and structures of the respective sections as well as the numerical values that have been referred to in the above description of the embodiments and the numerical embodiments are provided merely as one example for illustrative purposes for ease of understanding of various embodiments for carrying out the present invention, and these embodiments are not to be construed as limiting the technical scope of the present invention.

According to the above-mentioned embodiments, it is possible to construct an image capture apparatus which can be applied to video cameras, digital still cameras and the like, which can be satisfactorily corrected for various aberrations and which can be designed to be readily held and carried because its depthwise dimension can be made extremely thin even if its optical design length is long.

The present application contains subject matter related to Japanese Patent Application JP 2005-331333 filed in the Japanese Patent office on Nov. 16, 2005, the entire content of which are incorporated herein by reference.

What is claimed is:

1. An image capture apparatus comprising:
a zoom lens arranged in a housing and which includes a plurality of fixed lens groups, a plurality of movable lens groups and at least three optical-axis folding means; and
an imager device arranged in the housing, for converting an image formed by the zoom lens into an electrical signal,
wherein the zoom lens includes, in the following order from an object side:
a fixed first lens group including a negative lens group having a first optical axis, first optical-axis folding means for approximately perpendicularly folding an optical axis, and a positive lens group having a second optical axis, which is an optical axis after being folded by the first optical-axis folding means, the fixed first lens group having positive refractive power as a whole;
a plurality of movable lens groups and at least one fixed lens group arranged along the second optical axis to perform a zooming action, an image plane position correcting action and a focusing action; and
second optical-axis folding means arranged on an image side relative to a movable lens group that is closest to the image side among the plurality of movable lens groups, for approximately perpendicularly folding the optical axis,
wherein the optical axis is folded such that the imager device is arranged approximately in parallel with an inside wall surface of the housing, by optical-axis folding means positioned at a location closest to the image side among the at least three optical-axis folding means including the first and second optical-axis folding means.

2. An image capture apparatus comprising:
a zoom lens arranged in a housing and which includes a plurality of fixed lens groups, a plurality of movable lens groups and at least three optical-axis folding means; and
an imager device arranged in the housing, for converting an image formed by the zoom lens into an electrical signal,
wherein the zoom lens includes, in the following order from an object side:
a fixed first lens group including a negative lens group having a first optical axis, first optical-axis folding means for approximately perpendicularly folding an optical axis, and a positive lens group having a second optical axis folded by the first optical-axis folding means, the fixed first lens group having positive refractive power as a whole;
a plurality of movable lens groups and at least one fixed lens group arranged along the second optical axis to perform a zooming action, an image plane position correcting action and a focusing action;
second optical-axis folding means arranged on an image side relative to a movable lens group closest to the image side among the plurality of movable lens groups, for approximately perpendicularly folding the optical axis; and
third optical-axis folding means arranged on the image side relative to the second optical-axis folding means,
wherein the second optical axis is folded into a third optical axis approximately parallel to a plane containing the first optical axis and the second optical axis, by the second optical-axis folding means, and
wherein the third optical axis is folded by the third optical-axis folding means such that the imager device is arranged approximately in parallel with an inside wall surface of the housing.

3. An image capture apparatus comprising:
a zoom lens arranged in a housing and which includes a plurality of fixed lens groups, a plurality of movable lens groups and at least four optical-axis folding means; and
an imager device arranged in the housing, for converting an image formed by the zoom lens into an electrical signal,
wherein the zoom lens includes, in the following order from an object side:
a fixed first lens group including a negative lens group having a first optical axis, first optical-axis folding means for approximately perpendicularly folding an optical axis, and a positive lens group having a second optical axis folded by the first optical-axis folding means, the fixed first lens group having positive refractive power as a whole;
a plurality of movable lens groups and at least one fixed lens group arranged along the second optical axis to perform a zooming action, an image plane position correcting action and a focusing action;

second optical-axis folding means arranged on an image side relative to a movable lens group closest to the image side among the plurality of movable lens groups;

third optical-axis folding means arranged on the image side relative to the second optical-axis folding means; and fourth optical-axis folding means arranged on the image side relative to the third optical-axis folding means, wherein the second optical axis is folded into a third optical axis approximately parallel to a plane containing the first optical axis and the second optical axis, by the second optical-axis folding means, wherein the third optical axis is folded into a fourth optical axis approximately parallel to the second optical axis by the third optical-axis folding means, and wherein the fourth optical axis is folded by the fourth optical-axis folding means such that the imager device is arranged approximately in parallel with an inside wall surface of the housing.

4. The image capture apparatus according to claim 3, wherein:

the second optical-axis folding means and the third optical-axis folding means are respectively constructed as different reflection surfaces of the same prism and an entrance surface and an exit surface of the prism are positioned in the same plane.

5. An image capture apparatus comprising:

a zoom lens arranged in a housing and which includes a plurality of fixed lens groups, a plurality of movable lens groups and at least four optical-axis folding means; and an imager device arranged in the housing, for converting an image formed by the zoom lens into an electrical signal, wherein the zoom lens includes, in the following order from an object side:

a fixed first lens group including a negative lens group having a first optical axis, first optical-axis folding means for approximately perpendicularly folding an optical axis, and a positive lens group having a second optical axis folded by the first optical-axis folding means, the fixed first lens group having positive refractive power as a whole;

a plurality of movable lens groups and at least one fixed lens group arranged along the second optical axis to perform a zooming action, an image plane position correcting action and a focusing action;

second optical-axis folding means arranged on an image side relative to a movable lens group closest to the image side among the plurality of movable lens groups;

third optical-axis folding means arranged on the image side relative to the second optical-axis folding means; and fourth optical-axis folding means arranged on the image side relative to the third optical-axis folding means, wherein the second optical axis is folded into a third optical axis approximately parallel to the first optical axis by the second optical-axis folding means, wherein the third optical axis is folded into a fourth optical axis approximately perpendicular to a plane containing the second optical axis and the third optical axis by the third optical-axis folding means, and wherein the fourth optical axis is folded by the fourth optical-axis folding means such that the imager device is arranged approximately in parallel with an inside wall surface of the housing.

6. The image capture apparatus according to claim 1, 2, 3 or 5, wherein:

each of the optical-axis folding means following the first optical-axis folding means is constructed as a reflection surface of a prism having a refractive index and angle settings to ensure total reflection for all effective rays across the entire zoom range.

7. The image capture apparatus according to claim 1, 2, 3 or 5, wherein:

a package which houses the imager device has an outside dimension of at least 20 mm long on its screen's shorter side.

8. A zoom lens comprising, in the following order from an object side:

a first lens group including a negative lens group having a first optical axis, first reflection means for approximately perpendicularly folding an optical axis, and a positive lens group having a second optical axis folded by the first reflection means, the first lens group having positive refractive power as a whole;

a second lens group having negative refractive power and moving along the second optical axis to mainly perform a power variation;

a third lens group fixed on the second optical axis and having positive refractive power;

a fourth lens group having positive refractive power and moving along the second optical axis to perform focusing as well as correction of a variation of an image forming position due to the power variation;

a fifth lens group having negative refractive power and acting to extend a composite focus length and a back focus formed by the first to fourth lens groups; and a plurality of reflection means.

9. The zoom lens according to claim 8, wherein:

if the first reflection means is a reflection surface of a right-angled prism and the right-angled prism has a refractive index nf, and if the plurality of reflection means arranged on an image side relative to the fifth lens group include reflection surfaces of a plurality of prisms containing total reflection surfaces and the prisms have a refractive index nr, the following conditional formulae (1) and (2) are satisfied:

$$1.8 < nf, \text{ and} \quad (1)$$

$$1.62 < nr. \quad (2)$$

10. The zoom lens according to claim 8 or 9, wherein:

the negative lens group of the first lens group having the first optical axis is made of one concave meniscus lens having a convex surface facing the object side.

11. The zoom lens according to claim 8 or 9, wherein:

the negative lens group of the first lens group having the first optical axis is made of one convex lens and two concave meniscus lenses each having a convex surface facing the object side, the one convex lens and the two concave meniscus lenses being arranged in order of mention from the object side.

12. The zoom lens according to claim 8 or 9, wherein:

the positive lens group having the second optical axis, which is included in the first lens group, is made of a cemented lens which includes a convex lens, a concave lens and a convex lens arranged in the order of mention from the object side, the second lens group is made of two concave lenses and one convex lens arranged in the order of mention from the object side, the third lens group is made of one convex lens, the fourth lens group is made of a cemented lens which includes a convex lens and a concave lens, and the fifth lens group is made of a cemented lens which includes a concave lens and a convex lens, and the following conditional formulae (3) and (4) being satisfied:

$$v113a < 30, \text{ and} \quad (3)$$

$$v113c < 55, \quad (4)$$

where v113a represents the Abbe number of the convex lens that is positioned at a location closest to the object side and constitutes part of the positive lens group of the first lens group, and v113c represents the Abbe number of the convex lens of the cemented lens that constitutes part of the positive lens group of the first lens group.

13. The zoom lens according to claim 8 or 9, wherein:

the following conditional formulae (5), (6) and (7) are satisfied:

$$0.65 < |\beta 2T| < 1.1, \quad (5)$$

$$\beta 5 < 1.2, \text{ and} \quad (6)$$

$$|f5/f3| < 2.2, \quad (7)$$

where β2T represents the transverse magnification of the second lens group at a telephoto end thereof, β5 represents the transverse magnification of the fifth lens group, f3 represents the focal length of the third lens group, and f5 represents the focal length of the fifth lens group.

14. An image capture apparatus comprising:

a zoom lens arranged in a housing and which includes a plurality of fixed lens groups, a plurality of movable lens groups and at least three prisms; and an imager device arranged in the housing, for converting an image formed by the zoom lens into an electrical signal, wherein the zoom lens includes, in the following order from an object side:

a fixed first lens group including a negative lens group having a first optical axis, a first prism approximately perpendicularly folding an optical axis, and a positive lens group having a second optical axis, which is an optical axis after folded by the first prism, the fixed first lens group having positive refractive power as a whole;

a plurality of movable lens groups and at least one fixed lens group arranged along the second optical axis to perform a zooming action, an image plane position correcting action and a focusing action; and a second prism arranged on an image side relative to a movable lens group that is a closest to the image side among the plurality of movable lens groups, for approximately perpendicularly folding the optical axis and wherein the optical axis is folded such that the imager device is arranged approximately in parallel with an inside wall surface of the housing, by a prism positioned at a location closest to the image side among the at least three prisms including the first and second prisms.

\* \* \* \* \*